(12) United States Patent
Saito et al.

(10) Patent No.: US 10,054,971 B2
(45) Date of Patent: Aug. 21, 2018

(54) RECEIVED ENERGY REDUCTION INFORMATION CALCULATION APPARATUS, RECEIVED ENERGY REDUCTION INFORMATION CALCULATION METHOD AND PROGRAM

(71) Applicant: Kabushiki Kaisha Toshiba, Minato-ku (JP)

(72) Inventors: Masaaki Saito, Itabashi (JP); Dai Murayama, Musashino (JP); Yutaka Iino, Kawasaki (JP); Nagako Hisada, Koganei (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 670 days.

(21) Appl. No.: 14/379,592

(22) PCT Filed: Jun. 9, 2014

(86) PCT No.: PCT/JP2014/065183
§ 371 (c)(1),
(2) Date: Aug. 19, 2014

(87) PCT Pub. No.: WO2015/037290
PCT Pub. Date: Mar. 19, 2015

(65) Prior Publication Data
US 2015/0253795 A1   Sep. 10, 2015

(30) Foreign Application Priority Data
Sep. 13, 2013  (JP) ................................ 2013-190286

(51) Int. Cl.
*G05F 1/66* (2006.01)
*B60L 11/18* (2006.01)
(Continued)

(52) U.S. Cl.
CPC .............. *G05F 1/66* (2013.01); *B60L 11/184* (2013.01); *G05B 13/026* (2013.01); *G06Q 50/06* (2013.01);
(Continued)

(58) Field of Classification Search
None
See application file for complete search history.

(56) References Cited

U.S. PATENT DOCUMENTS 5,481,140 A    1/1996  Maruyama et al.
8,457,801 B2   6/2013  Steven et al.
(Continued)

FOREIGN PATENT DOCUMENTS

CN    102279297 A    12/2011
CN    102446289 A     5/2012
(Continued)

OTHER PUBLICATIONS

Wang, et al., "A New Wholesale Bidding Mechanism for Enhanced Demand Response in Smart Grids", 2010, IEEE.*
(Continued)

*Primary Examiner* — Qing Yuan Wu
(74) *Attorney, Agent, or Firm* — Oblon, McClelland, Maier & Neustadt, L.L.P.

(57) ABSTRACT

A received electric power reduction information calculation apparatus (corresponding to an example of a received energy reduction information calculation apparatus) has an energy predictor and a reduction information calculator. The energy predictor predicts a prediction amount of at least one of energy supply and energy consumption in a future prescribed time period with respect to at least one of an energy-supplying equipment and an energy-consuming equipment, based on a request for reduction of the received energy. The reduction information calculator calculates the
(Continued)

reduction amount of the received energy associated with the prediction amount, based on an energy fee reflected from an expected fee of incentive with respect to the reduction request of the received energy.

12 Claims, 13 Drawing Sheets

(51) Int. Cl.
    *G05B 13/02* (2006.01)
    *H02J 3/00* (2006.01)
    *G06Q 50/06* (2012.01)
    *G06Q 10/04* (2012.01)

(52) U.S. Cl.
    CPC ............... *G06Q 10/04* (2013.01); *H02J 3/00* (2013.01); *H02J 2003/003* (2013.01); *Y02B 70/3216* (2013.01); *Y02B 70/3225* (2013.01); *Y04S 10/54* (2013.01); *Y04S 10/542* (2018.05); *Y04S 20/222* (2013.01); *Y04S 20/224* (2013.01)

(56) References Cited

U.S. PATENT DOCUMENTS

| | | | |
|---|---|---|---|
| 8,457,802 B1 | 6/2013 | Steven et al. | |
| 8,996,184 B2 | 3/2015 | Son et al. | |
| 2010/0138363 A1 | 6/2010 | Batterberry et al. | |
| 2011/0282510 A1 | 11/2011 | Son et al. | |
| 2012/0310860 A1 | 12/2012 | Kim et al. | |
| 2015/0081413 A1* | 3/2015 | Okabe | G06Q 50/06 705/14.24 |

FOREIGN PATENT DOCUMENTS

| | | |
|---|---|---|
| CN | 102855525 A | 1/2013 |
| EP | 0 561 255 A1 | 9/1993 |
| EP | 0 564 255 A1 | 9/1993 |
| JP | 5-284649 A | 10/1993 |
| JP | 2005-51866 A | 2/2005 |
| JP | 2006-92044 A | 4/2006 |
| JP | 2007-41969 | 2/2007 |
| JP | 2012-191707 | 10/2012 |
| WO | WO 2012/145563 A1 | 10/2012 |
| WO | WO 2013/128953 A1 | 9/2013 |

OTHER PUBLICATIONS

International Search Report dated Sep. 2, 2014 in PCT/JP2014/065183 (with English language translation).
Extended Search Report dated Jun. 22, 2017, in European Patent Application No. 14750300.7.

* cited by examiner

RECEIVED ENERGY REDUCTION INFORMATION CALCULATION APPARATUS, RECEIVED ENERGY REDUCTION INFORMATION CALCULATION METHOD AND PROGRAM

TECHNICAL FIELD

Embodiments of the present invention relate to a received energy reduction information calculation apparatus and a received energy reduction information calculation method, and a program.

BACKGROUND ART

Active efforts are underway in developing smart communities aimed at making optimal use of energy in an overall town or region, by integrated management of diverse urban infrastructure such as electric power and transportation. One of the approaches directed to such smart communities is that of demand response (DR).

Demand response is an approach to achieving optimal energy utilization in an overall region, by promoting a reduction in the amount of energy supplied to buildings, homes or the like during times in which the supply-and-demand situation is tight. Demand response is the subject of particular study with regard to electrical energy, and a number of control techniques for electric power-consuming equipment related to demand response have been proposed.

As methods of reducing the amount of received power related to demand response regarding electrical energy, methods of increasing the electricity unit purchase price and methods of granting incentives in accordance with the amount of reduction in received power amount can be cited. The term incentive as used here refers to a consideration (a so-called reward) for paying for reduction in the received power amount made to promote reduction of the received energy amount, such as the received power amount.

PRIOR ART REFERENCE

Patent Reference

[Patent Reference 1] Japanese Laid-open Patent Publication No. 2012-191707

SUMMARY OF THE INVENTION

Problem to be Solved by the Invention

Although various demand response systems are being considered, one of them is the method of determining an incentive amount by an exchange (bidding) between energy suppliers and energy consumers.

Conventionally, however, in demand response the incentive unit price offered by the energy supplier side has been fixed, and the corresponding energy reduction amount has been either fixed or indeterminate (not specifically established). For this reason, when the bidding-type demand response system is adopted, the energy consumer has not had a means for grasping the proper amount of reduction in the received energy in relation to the incentive unit price, and has been forced to determine the approximately received energy reduction amount and the like from long experience. The result has been a possibility of a loss on the part of the energy consumer and a need for hardware or the like to solve this type of problem.

The problem to be solved by the present invention is to provide a received energy reduction information calculation apparatus, a received energy reduction information calculation method, and a program that enable determination of a proper received energy reduction amount with respect to an energy consumer, in relation to the determination of the incentive unit price in bidding-type demand response.

Means for Solving the Problem

A received electric power reduction information calculation apparatus of embodiments corresponds to one example of a received energy reduction information calculation apparatus. The received electric power reduction information calculation apparatus has an energy predictor and a reduction information calculator. Based on a request for reduction of the received energy, the energy predictor, for at least one of an energy-supplying equipment and an energy-consuming equipment, determines a prediction amount of at least one of energy supply and energy consumption in a future prescribed time period. The reduction information calculator, based on an energy fee reflected from an expected fee of incentive with respect to the reduction request of the received energy, calculates the reduction amount of the received energy, in associated with the prediction amount.

EMBODIMENTS

<First Embodiment>

In the following embodiment, although the example described will be one in which the demand response target is electric power (electrical energy), this does not preclude an embodiment in which the demand response target is a different energy.

Figure 1:
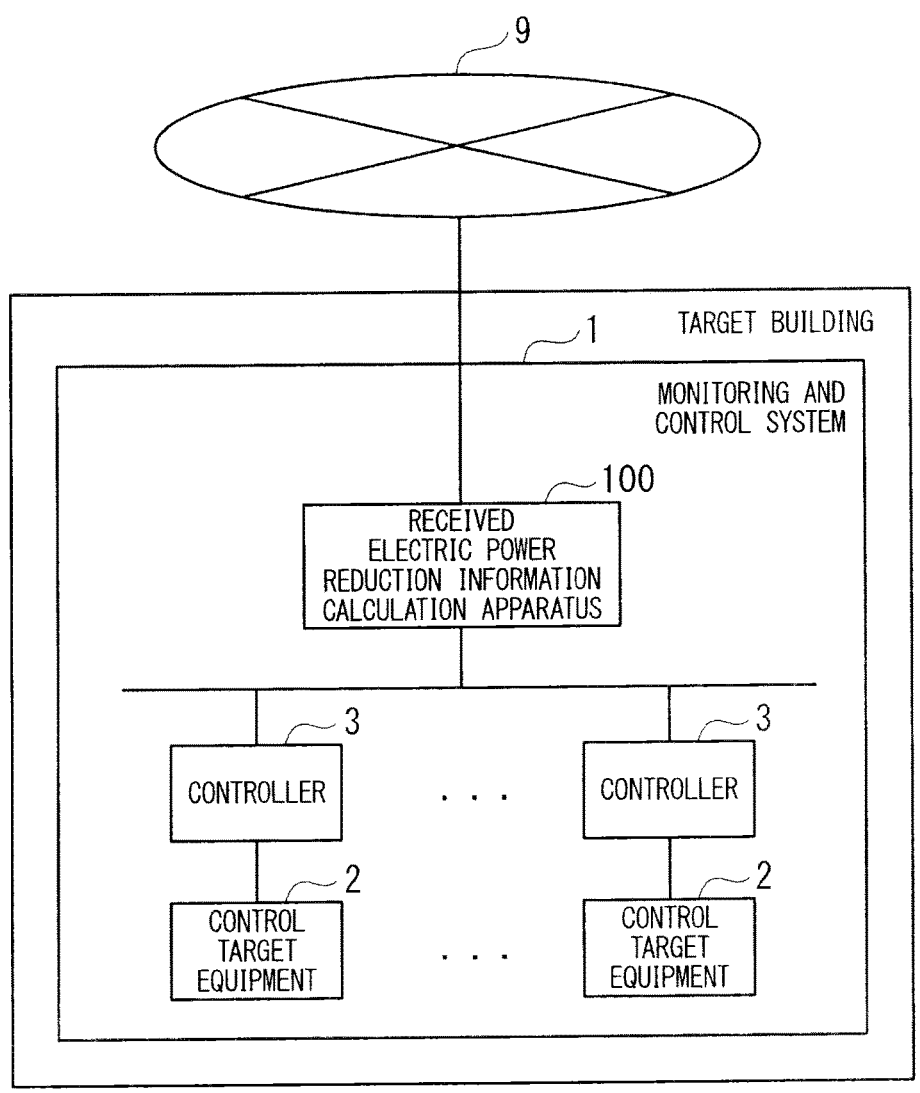
FIG. 1 is a descriptive drawing showing an example of the hardware constitution of a monitoring and control system of a first embodiment.

FIG. 1 is a descriptive drawing showing an example of the hardware constitution of a monitoring and control system of the present embodiment. In the drawing, a monitoring and control system 1 has various control target equipments 2, controllers 3, and a received electric power reduction information calculation apparatus 100, which are installed in a building that is the management target (hereinafter, referred to as the "target building"). The received electric power reduction information calculation apparatus 100 corresponds to an example of a received energy reduction information calculation apparatus.

The monitoring and control system 1 monitors and controls the control target equipments.

The control target equipments 2 are the target of control, for the purpose of reducing the received electric power in demand response. The control target equipments 2 include energy-supplying equipments and energy-consuming equipments.

Energy-consuming equipments are electric power consuming equipments that consume received electric power, which is supplied energy. Specifically, these include ventilation equipments, illumination equipments, and heat-sourcing equipments.

In contrast, energy-supplying equipments include energy-generating equipments and energy-storing equipments.

An energy-generating equipment generates another form of energy by converting one form of energy into another form of energy, and supplies the generated energy to other equipments. Examples of energy-generating equipments include a photovoltaic apparatus that converts sunlight to electricity, a solar water heater that converts solar heat to heat, and a co-generation system (CGS) that burns gas to generate electricity and exhaust heat.

Energy-storing equipments are equipments such as rechargeable batteries and heat storage tanks that supply stored energy to other equipments.

A control target equipment 2 may be a equipment having a plurality of functions such as those of an energy-consuming equipment, an energy-generating equipment, and an energy-storing equipment.

The controller 3 is connected to the control target equipments 2 via a communication line and controls operation, for example, the starting, stopping, and output of each control target equipment 2. In the following, startup and stopping will be referred to as start/stop.

A controller 3 may be provided for each control target equipment 2 or one controller 3 may perform collective control for a plurality of control target equipments 2.

The received electric power reduction information calculation apparatus 100 optimizes the operating schedule of the control target equipments 2. The received electric power reduction information calculation apparatus 100, based on the results of the optimization, offers bidding conditions whereby it is difficult for an electric power consumer to suffer a loss in bidding-type demand response. The term electric power consumer as used here is a user or manager of a target building, who manages the received electric power to the control target equipment 2 and who receives an incentive with respect to the reduction of the received electric power.

The received electric power reduction information calculation apparatus 100 uses, for example, a schedule of the operation of each control target equipment 2 for individual time period in a prescribed time period in the future as the operating schedule. For example, the operating schedule may include start/stop information such as from what time and up to what time a control target equipment is to be operating. If there is a plurality of control target equipments 2, the operating schedule may include information as to how many of the control target equipments 2 are to be operated from what time to what time. The operating schedule may include quantitative values such as control setting values regarding the degree of output of a control target equipment 2.

The control setting values are parameters for controlling the operating state of each control target equipment 2. Examples of a control setting value include the temperature setting value or PMV setting value of a ventilating equipment, and the illumination setting value of illumination, these being energy-consuming equipments. The PMV stands for predicted mean vote, which is set forth in the ISO 7730 thermal comfort index for ventilation and is a quantification of how a person feels coldness. In this, 0 indicates a comfortable value, a negative value indicates a cold value, and a positive value indicates a warm value. The parameters used to calculate the PMV are temperature, humidity, mean radiated temperature, amount of clothing, amount of physical activity, wind speed, and the like.

The received electric power reduction information calculation apparatus 100 is constitution, for example, by a computer such as a personal computer. FIG. 1 shows an example in which the received electric power reduction information calculation apparatus 100 is installed within the building that is the management target and, for example, the received electric power reduction information calculation apparatus 100 may be provided in the cloud and control each of the control target equipments remotely.

Also, demand response that deals with the received electric power reduction information calculation apparatus 100 is not limited to bidding-type demand response. For example, the demand response may be the type in which there is an exchange between an electric power supplier and an electric power consumer to determine the incentive amount, such as determining the incentive amount in a one-to-one exchange between an electric power supplier and an electric power consumer.

Figure 2:
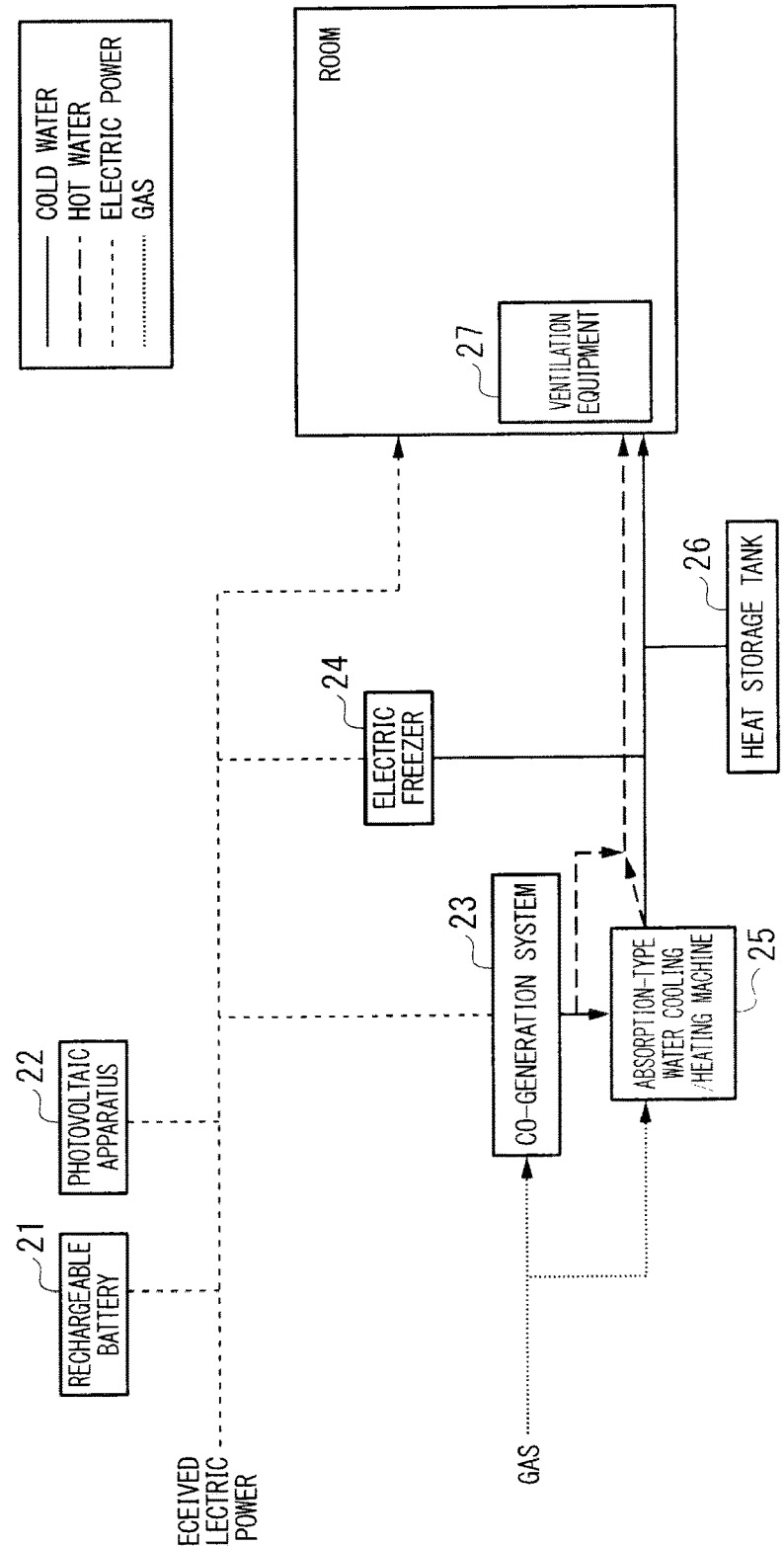
FIG. 2 is a descriptive drawing showing the constitution of a control target equipment and an example of the flow of supplied energy in the first embodiment.

FIG. 2 is a descriptive drawing showing the constitution of a control target equipment 2 and an example of the flow of supplied energy. In this drawing, a rechargeable battery 21, a photovoltaic apparatus 22, a co-generation system 23, an electric freezer 24, an absorption-type water cooling/heating machine 25, a heat storage tank 26, and a ventilation equipment 27 are shown as control target equipments 2.

Any of the equipments shown in FIG. 2 may be omitted as the control target equipments of FIG. 1. The present embodiment does not preclude equipments not shown in FIG. 2. For example, other equipments, such as a heat pump, a water-cooled freezer, a solar water heater and the like may be installed as control target equipments 2.

The rechargeable battery 21 is equipment that stores electric power by charging and supplies stored electric power to other equipments.

The photovoltaic apparatus 22 is equipment that has a solar panel and receives and converts sunlight to electric power. The amount of electric power supplied by the photovoltaic apparatus 22 varies, depending upon weather conditions, such as the weather.

The co-generation system 23 supplies electric power and exhaust heat by generating electricity. Specifically, the co-generation system 23 generates electricity by either an internal combustion engine or an external combustion engine. The co-generation system 23 exhausts heat by combustion of a fuel when generating electricity. The exhaust heat from the co-generation system 23 is used as thermal energy.

The co-generation system 23 generates electricity and exhausts heat using gas as an energy source. However, the energy used by the co-generation system 23 is not limited to gas. For example, the co-generation system 23 may generate electricity and exhaust heat by using a fuel cell.

The electric freezer 24 utilizes the compression, condensation, and evaporation processes of a gaseous refrigerant to perform refrigeration, and a compression-type freezer. The electric freezer 24 compresses a refrigerant using a motorized compressor that uses electric power as energy.

The absorption-type water cooling/heating machine 25 is equipment that heats and cools, operating by using a heat source. The absorption-type water cooling/heating machine 25 achieves a low temperature by absorbing a refrigerant into absorbent fluid and vaporizing the refrigerant in a low-pressure state that results. The absorption-type water cooling/heating machine 25 heats the absorbent fluid into which the refrigerant has been absorbed to vaporize the refrigerant. The absorption-type water cooling/heating machine 25 can also supply heat by a heating process.

The heat storage tank 26 stores heat by using a reservoir of heat medium.

The electric freezer 24, the absorption-type water cooling/heating machine 25, and the heat storage tank 26 can supply heated water and cold water for the ventilation equipment 27.

FIG. 2 shows the relationship of energy delivering and receiving in which electricity, cooling, or heating is supplied to the ventilation equipment 27 and the like installed in a room inside the target building, using electric power, gas, or sunlight supplied from outside the constitution of the control target equipments 2 as a source of energy.

Electric power obtained from outside (for example, from a commercial electric power grid) is either stored by the rechargeable battery 21 or supplied to energy-consuming equipments. The electric power generated by the photovoltaic apparatus 22 or the co-generation system 23 is also either stored in the rechargeable battery 21 or supplied to energy-consuming equipments.

For example, the electric freezer 24, as an energy-consuming equipment, receives a supply of electric power. The electric freezer 24 consumes electric power it has been supplied with and generates cooling.

The co-generation system 23 or the absorption-type water cooling/heating machine 25 receive a supply of gas from the gas supply system.

The absorption-type water cooling/heating machine 25 combusts the gas from the gas supply system and generates cooling or heating. The absorption-type water cooling/heating machine 25 can generate cooling by the heat exhausted (heating) from the co-generation system 23 as well. Additionally, the absorption-type water cooling/heating machine 25 can increase the amount of generated cooling by acceptance of gas. The absorption-type water cooling/heating machine 25 can also generate heating by the acceptance of gas alone.

The cooling generated by the electric freezer 24 or the absorption-type water cooling/heating machine 25 is either stored in the heat storage tank 26 or supplied to the ventilation equipment 27 installed in a room. The ventilation equipment 27 cools a room by the supplied cooling. The ventilation equipment 27 can also heat the room by being supplied with hot water generated by either the co-generation system 23 or the absorption-type water cooling/heating machine 25.

Figure 3:
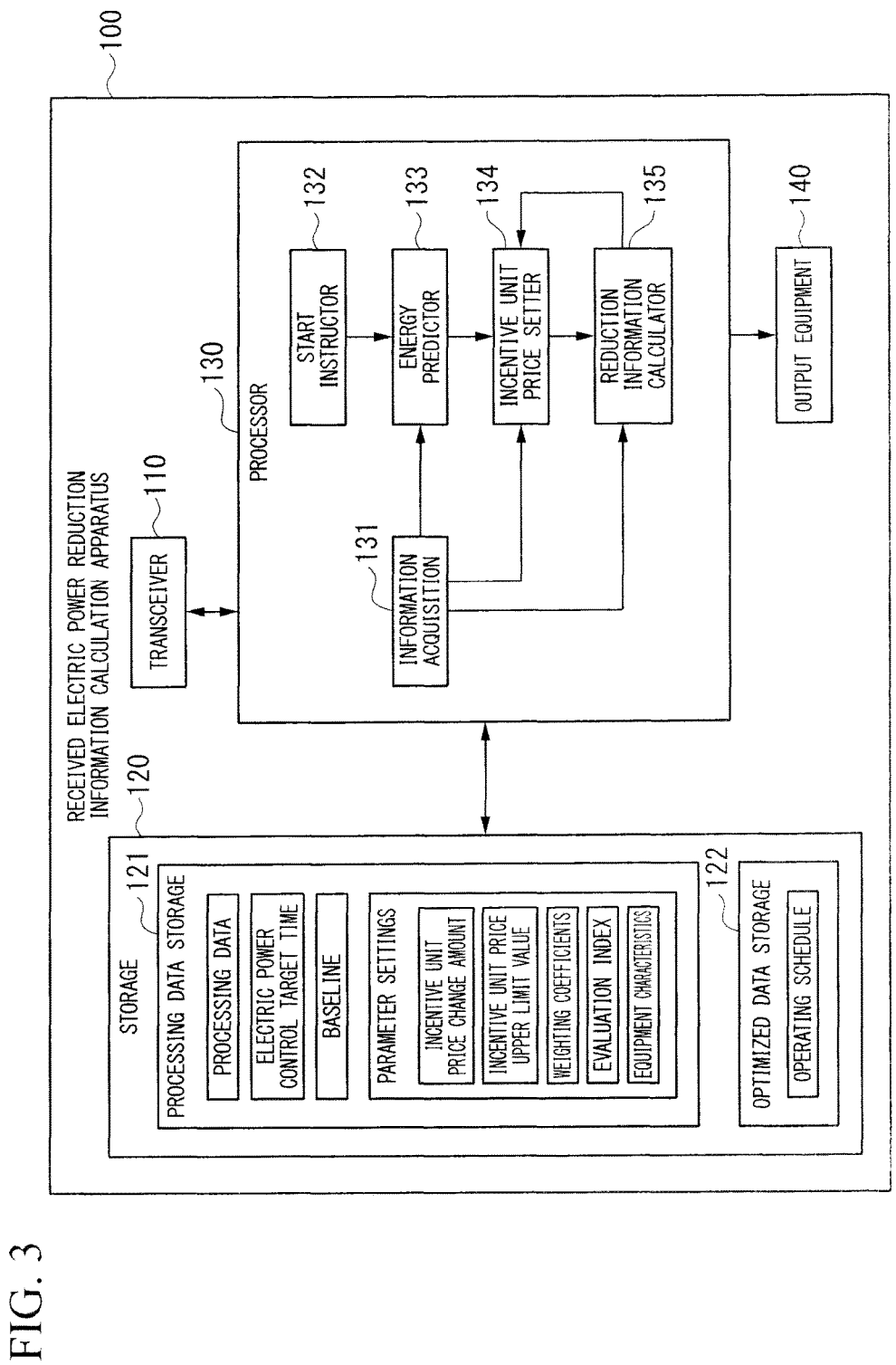
FIG. 3 shows the general functional constitution of a received electric power reduction information calculation apparatus of the first embodiment.

FIG. 3 shows the general functional constitution of received electric power reduction information calculation apparatus 100. The received electric power reduction information calculation apparatus 100 has a function as a bidding support apparatus for the electric power reduction amount.

The received electric power reduction information calculation apparatus 100 has a transceiver 110, a storage 120, a processor 130, and an output equipment 140. The storage 120 has a processing data storage 121 and an optimized data storage 122. The processor 130 has an information acquisition 131, a start instructor 132, an energy predictor 133, an incentive unit price setter 134, and a reduction information calculator 135.

The transmitting and receiving unit 110 can be connected to a communication network 9 (FIG. 1) and, via the communication network 9, transmit and receive information to and from a terminal apparatus of a building manager, a host system on the demand response issuing side, and a server providing weather information or the like.

The transmitting and receiving unit 110 can communicate with the controller 3 (FIG. 1) via the communication line, and can transmit to the controller 3 an operating schedule of a control target equipment 2 calculated by an optimization computation by the reduction information calculator 135. This enables the controller 3 can control the control target equipment 2 in accordance with the operating schedule.

Without going through the transmitting and receiving unit 110, a user of the received electric power reduction information calculation apparatus 100 (for example, a user or manager of the target building) can input information required for the processing performed by the processor 130, from a keyboard or the like.

The transmission of the operating schedule to the controller 3 and transmission of information from the received electric power reduction information calculation apparatus 100, such as bidding information to the host system on the demand response issuing side are not essential. For example, the user of the received electric power reduction information calculation apparatus 100 may reference information displayed by the received electric power reduction information calculation apparatus 100 and input bidding conditions from the bidding screen on the network.

Specifically, the storage 120 is constituted by storage equipments (not shown) provided within the received electric power reduction information calculation apparatus 100 and stores various information.

The processing data storage 121 stores information required for processing performed by the processor 130. In particular, the processing data storage 121 stores setting parameters required for the calculation of received power amount reduction conditions by the reduction information calculator 135, process data, demand response target time information, and baseline information.

The setting parameters stored by the processing data storage 121 include information such as an incentive unit price change amount, an incentive unit price upper limit value, a weighting coefficient, an evaluation index, and equipment characteristics.

The term incentive unit price as used here is the unit for calculating the amount of an incentive, which is multiplied by the received energy reduction amount to calculate the incentive amount. For example, the demand response incentive unit price of electrical power is expressed in units such as (Yen/kilowatt-hour (kWh)) or (Yen/kilowatt (kw)).

The incentive unit price change amount and incentive unit price upper limit value are used for the setting of the incentive unit price by the incentive unit price setter 134. Based on the incentive unit price set by the incentive unit price setter 134, the reduction information calculator 135 optimizes the operating schedule of the control target equipment 2.

The weight coefficient is used in a similarity computation by the energy predictor 133 to forecast the consumed energy or the supplied energy of a control target equipment 2.

The evaluation index should be minimized in the optimization computation by the reduction information calculator 135 that optimizes the operating schedule of the control target equipment 2. For example, the energy fee (electricity fee or gas fee) is used as an evaluation index of a control target equipment 2.

The equipment characteristics include various parameters determined in accordance with the characteristics of each piece of equipment, such as ratings, lower limit output, COP (coefficient of performance) of each control target equipment 2. The COP is a performance coefficient of a heat-sourcing equipment such as a heat pump. The value obtained by dividing the cooling or heating capacity by the electric power consumption can be used as the COP.

The process data includes information from outside that varies with the elapse of time. For example, weather data and operating data correspond to process data. The term weather data used here may be past weather data, may be weather forecast data, or may include both.

Operating data includes past control setting values of each control target equipment 2, and state quantities and failure conditions for each control target equipment 2 when the operating schedule is executed. The state quantities of each control target equipment 2 when the operating schedule is executed include the consumed energy and produced energy of each control target equipment 2. For example, state quantities include the output and load rate of co-generation system 23, the electric freezer 24, and the absorption-type water cooling/heating machine 25 as energy-supplying equipments. Additionally, the state quantities of each control target equipment 2 when the operating schedule is executed include the discharge amount and heat storage amount of the rechargeable battery 21, which is an energy-storing equipment, and heat radiation amount and heat storage amount and the like of a heat storage equipment.

The demand response target time stored by the processing data storage 121 is the target time for achieving a reduction in the received electric power amount by the demand response. Specifically, the demand response target time is the time of raising the electricity unit price or, the time of becoming the target for payment of an incentive if the reduction of the received electric power amount has been successful.

The baseline is a threshold of the used electric power amount that is taken as the criterion of whether or not to grant an incentive. The baseline can be set based on the amount of electric power used by an electric power consumer in a given period of time in the past. For example, the base line is determined by calculation, based on the actual value of electric power used in a building over a number of days or number of weeks in the past.

In the present embodiment, as an example, the baseline is set with the unit of one day, and a certain baseline is used within a day. However, the baseline is not limited to the baseline used in the present embodiment, and only has to serve as a calculation criterion for the received electric power reduction amount.

The optimized data storage 122 stores data obtained by the processing by the processor 130. For example, the optimized data storage 122 stores optimized control target equipment 2 operating schedules and various data that has been used in optimization by the reduction information calculator 135.

The processor 130 controls various parts of the received electric power reduction information calculation apparatus 100 and executes various functions. Specifically, the processor 130 is implemented by a non-illustrated CPU (central processor) within the received electric power reduction information calculation apparatus 100 reading out a program from the storage 120 and executing the program.

The information acquisition 131 acquires and manages various information. For example, the information acquisition 131 connects the communication network 9 (FIG. 1) via the transmitting and receiving unit 110 and acquires various information, such as process data, demand response target times, and baselines. The information acquisition 131 acquires information such as parameter values input by a user of the received electric power reduction information calculation apparatus 100 using an input equipment. The information acquisition 131 stores the acquired information into the processing data storage 121. The information acquisition 131 functions in the processor 130 as an interface with the storage 120 and reads out various information from the storage 120.

The start instructor 132 prompts the start of bidding condition acquisition processing by the processor 130 at a pre-set timing. The term bidding condition acquisition processing used herein is the acquisition of information that optimizes the operating schedule of the control target equipment 2 and indicates the demand response bidding conditions.

For example, if the received electric power reduction information calculation apparatus 100 is operating to optimize the operating schedule of the control target equipment 2 for the next day, at a prescribed time every day the start instructor 132 outputs to the energy predictor 133 trigger information that prompts the start of processing. What time the prescribed time is to be made can be freely set. The received electric power reduction information calculation apparatus 100 may operate so as to optimize the operating schedule of the control target equipment 2 every several days.

If, however, the received electric power reduction information calculation apparatus 100 operates so as to optimize the operating schedule on that day, at fixed time intervals the start instructor 132 outputs to the energy predictor 133 trigger information that prompts the start of processing.

The energy predictor 133 determines the forecast value of energy input and output amounts of the control target equipment 2 in a period of time in the future. Specifically, the energy predictor 133 determines the energy supply amount and the energy consumption amount of each control target equipment 2 in a demand response target time period.

The incentive unit price setter 134 sets a plurality of incentive unit prices in the demand response. In particular, the incentive unit price setter 134 acquires the incentive unit price change amount and the incentive unit price upper limit value and, based on the obtained change amount and upper limit value, sets a plurality of incentive unit prices, following a pre-established procedure that will be described later.

The reduction information calculator 135, based on an energy fee that is made to reflect an expected fee of incentive with respect to an reduction of the received electric power, determines the amount of reduction of the received electric power corresponding to the energy supply amount of each control target equipment 2 and the forecast value of energy consumption amount. Specifically, the reduction information calculator 135 makes the electricity fee reflect the incentive unit price set by the incentive unit price setter 134 and, based on the electricity fee unit price and the gas fee unit price, performs an optimizing calculation to minimize the energy fee. Based on the optimization computation, the reduction information calculator 135 acquires an operating schedule of the control target equipment 2 and calculates the reduction amount of the received electric power.

In particular, the reduction information calculator 135 calculates the reduction amount of the received electric power for each of a plurality of incentive unit prices set by the incentive unit price setter 134.

The output equipment 140 outputs the reduction amount of the received electric power acquired by the reduction information calculator 135.

Specifically, the output equipment 140 has a display screen and displays the reduction amount of the received electric power calculated by the reduction information calculator 135, using a graph showing the relationship between the reduction amount of the received electric power and the incentive unit price. Additionally, the output equipment 140 displays a graph of past finalized incentive unit prices.

However, the method of the output equipment 140 outputting the amount of reduction of the received electric power acquired by the reduction information calculator 135 is not limited to a screen display of a graph or the like. For example, the output equipment 140 may output the amount of reduction of the received electric power acquired by the reduction information calculator 135 by voice or by transmission of an e-mail.

A display equipment or printer or the like, or other type of output equipment existing today or that becomes usable in the future may be used as the output equipment 140. By the output equipment 140 making a display or the like of data stored in the processing data storage 121 or the optimized data storage 122, the user of the received electric power reduction information calculation apparatus 100 can reference the data.

The received electric power reduction information calculation apparatus 100 has an input equipment for inputting information required processing by each unit and inputting selections and instructions of processing. Various input equipments usable either at present or becoming usable in the future, such as a keyboard, a mouse, a touch panel, switches, or the like may be used as the input equipment. The input equipment may also perform the function of the information acquisition 131.

Next, referring to FIG. 4, the relationship between the received electric power amount of an electric power consumer, the baseline, the demand response target time, and the electric power reduction amount in bidding-type demand response will be described.

Figure 4:
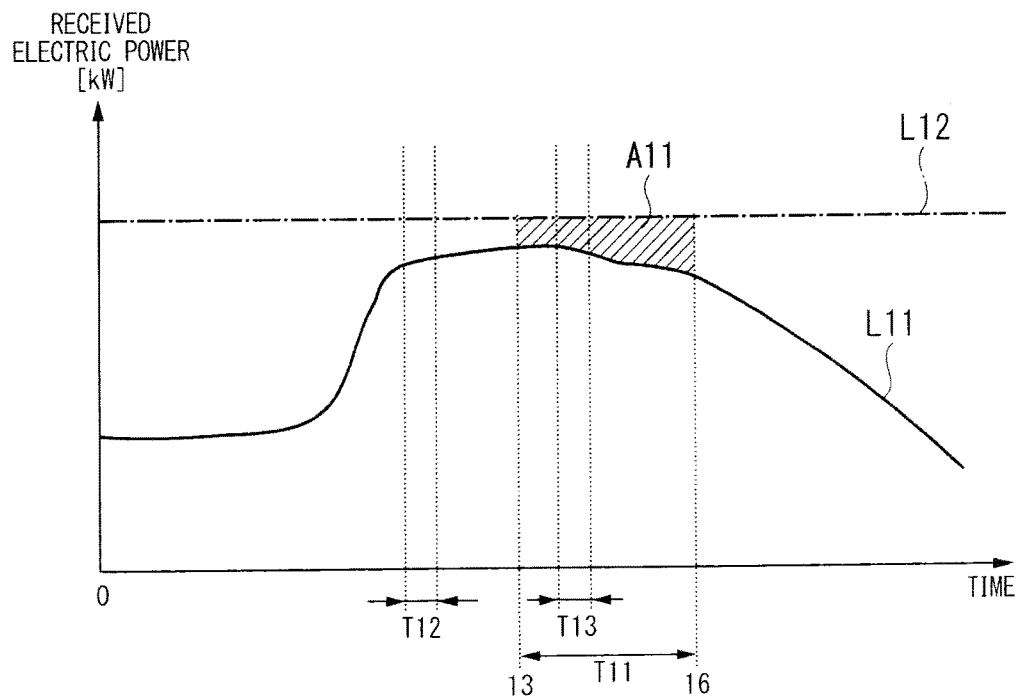
FIG. 4 is a graph showing an example of received electric power of a target building in the first embodiment.

FIG. 4 a graph showing an example of the received electric power of the target building, in which drawing the horizontal axis represents time over a one-day period and the vertical axis represents the received electric power of the target building. In the example shown in this drawing, the time period T11 from 1300 to 1600 is the target time period for electric power suppression by demand response.

The line L11 shows an example of the trend in received electric power of the target building. The line L12 shows the target building baseline, which is determined based on the actual past received electric power record of the target building.

The region A11 shows the electric power reduction amount in the target time period for electric power suppression by demand response. In the target time period for electric power suppression by demand response (1300 to 1600 in FIG. 4), the part of the received electric power amount that falls below the set baseline is treated as being the electric power reduction amount for payment of an incentive.

The time period T12 is not included in the target time period for electric power suppression by demand response. For this reason, regarding the time period T12, although the received electric power amount falls below the baseline, it is not a period for payment of an incentive.

In contrast, the time period T13 is included in the target time period for electric power reduction by demand response.

For this reason, the received electric power reduction amount in the time period T13 is relevant for payment of an incentive. In bidding-type demand response, a target value of received electric power reduction amount in the target time period for electric power suppression is input beforehand, and an incentive is paid to an electric power consumer only if the actual received electric power reduction amount exceeds the target value.

Next, referring to FIG. 5, the operation of the received electric power reduction information calculation apparatus 100 will be described.

Figure 5:
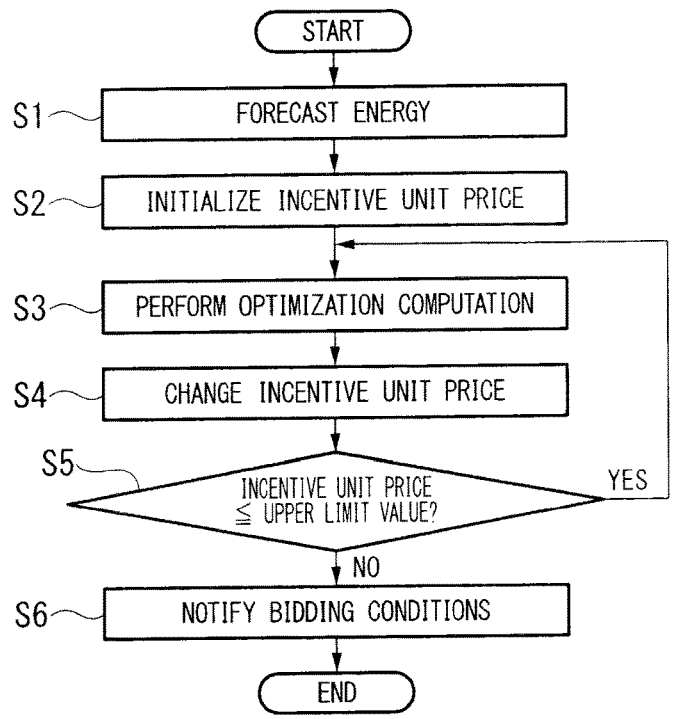
FIG. 5 is a flowchart showing the processing procedure for the received electric power reduction information calculation apparatus to calculate bidding conditions in demand response in the first embodiment.

FIG. 5 is a flowchart showing the processing procedure for the received electric power reduction information calculation apparatus 100 calculating the bidding conditions in demand response.

In the following, an example of the received electric power reduction information calculation apparatus 100 optimizing on the evening of the previous day the operating schedule of the control target equipment 2 in the target building for the next day will be described. The operating schedule optimized by the received electric power reduction information calculation apparatus 100 need only be an established time period in the future, this being not limited to either the next day or a day after the next day.

First, at pre-established time, the start instructor 132 instructs the execution of optimization processing. For example, when the time 2100 on the previous day is reached, the start instructor 132 outputs trigger information that prompts the start of processing to the energy predictor 133.

Based on the instruction from the start instructor 132, the processor 130 starts executing the bidding conditions acquisition processing. The flowchart of FIG. 5 shows the processing flow after the bidding conditions acquisition processing execution is started in the processor 130 based on the instruction from the start instructor 132.

The energy predictor 133, based on past weather data and operating data for a prescribed time period stored in the processing data storage 121, forecasts the consumed energy or the supplied energy of the control target equipment 2 (step S1).

For example, the processing data storage 121 stores beforehand the past day of the week, weather, temperature, and humidity as meteorological data and operating data. Then, the energy predictor 133, based on the past day of the week, weather, temperature, and humidity, calculates the similarity between the situation indicated by the meteorological data and operating data and the situation at the forecasted time. An example of a formula for calculating the similarity is shown as Equation (1).

[Equation 1]

Similarity=|Day of the Week Weighting|+|Weather Weighting|+|Next-Day Maximum Temperature−$TM_i$|+$b$×|Next-Day Minimum Temperature−$TL_i$|+$c$×|Next-Day Relative Humidity−$RH_i$|→min($i$=1,2,3, . . . ,$n$−1,$n$)  Equation (1)

The energy predictor 133 substitutes the pre-set weighting coefficients for each day of the week into the "Day of the week weighting" in Equation (1). If the day of the week at the forecast target time matches the day of the week indicated by the meteorological data and operating data, the value of the "Day of the week weighting" increases. If, however, the day of the week at the forecast target time does not match the day of the week indicated by the meteorological data and operating data, the value of the "Day of the week weighting" decreases. If both the day of the week at the forecast target time and the day of the week indicated by the meteorological data and the operating data are weekdays or both are holidays, the "Day of the week weighting" may be made a value that is relatively small.

The energy predictor 133 substitutes the pre-established weighting coefficients for each weather into the "Weather weighting" in Equation (1). For example, if the weather forecast for the following day is "clear," and the past data is "clear," the value of the weighting coefficient decreases. If, however, the forecast for the following day is "clear," but if the past data is "rain," the value of the weighting coefficient increases.

The energy predictor 133 substitutes the expected maximum temperature, minimum temperature, and relative humidity, respectively, into the "Next-day maximum temperature," "Next-day minimum temperature," and "Next-day relative humidity." The energy predictor 133 uses as past meteorological data the maximum temperature $TM_i$, the minimum temperature $TL_i$, and the relative humidity $RH_i$ for each day recorded in association with the day numbers of days in the past. The term day number as used herein refers to serial numbers assigned, with the operating data and the corresponding meteorological data stored in the processing data storage 121, arranged by day.

The symbols a, b, and c are weighting coefficients for each factor, and the values thereof are pre-established.

The values of a, b, c, such as weighting depending on the day of the week, the weather and the like are, for example, pre-set by a user. For example, if the user inputs these values from a keyboard of the received electric power reduction information calculation apparatus 100, the information acquisition 131 causes the information acquisition 121 to store them In this manner, the energy predictor 133 performs a calculation to determine the similarity of a past day data, based on Equation (1).

Next, the energy predictor 133 extracts the day number at which the similarity determined as noted above is minimum. The energy predictor 133 then sets the energy consumed by or supplied by the control target equipment 2 on the day corresponding to the extracted day number as the energy forecast value of the next day.

After step S1, the incentive unit price setter 134 initializes the incentive unit price (step S2). The incentive unit price setter 134 initializes the incentive unit price to a pre-established minimum value (for example, 0).

Next, the reduction information calculator 135 optimizes the operating schedule of the equipment, based on the forecast value of the energy predictor 133 (step S2). For example, the reduction information calculator 135 minimizes the value of the target function defined as shown in Equation (2), based on the restriction conditions indicated by Equation (3) to Equation (9) and Table 1, which are described later.

[Equation 2]

$$\sum_{t=ts}^{te} [X1^t \cdot E_C^t + GAS^t \cdot GAS_C] \Rightarrow \min \quad \text{Equation (2)}$$

In the above, t indicates time. Variable values at time t are indicated by appending the superscript t to the variable. The is and to indicate the start and end times, respectively, of demand response. For example, if the demand response target period is from 1300 to 1600 and the time divisions oft are taken to be 30 minutes, this would result in ts=27 and te=32.

X1 indicates the received electric power amount, and $X1^t$ indicates the received electric power amount at the time t.

$E_c$ indicates the electric power coefficient, and $E_c^t$ indicates the electric power coefficient at the time t. The term electric power coefficient as used herein is the electricity fee per unit amount. $E_c^t$ is defined as shown in Equation (9), which will be described later.

GAS indicates the amount of gas used and $GAS^t$ indicates the amount of gas used at the time t.

$GAS_c$ is the gas coefficient. The term gas coefficient as used herein is the gas fee per unit amount.

Equation (3) indicates the supply-and-demand relationship of electric power.

[Equation 3]

$$X1^t + E_{CGS} \cdot X6^t + E_{PV} + (X8^t - X8^{t+1}) = \frac{H_R}{COP_R} \cdot X5^t + E_{DEMAND}^t \quad \text{Equation (3)}$$

In the above, $E_{CGS}$ indicates the rated amount of electricity generated by the co-generation system.

X6 indicates the load rate of the co-generation system, and $X6^t$ indicates the load rate of the co-generation system at the time t.

$E_{PV}$ indicates the prediction amount of PV (photovoltaic) electricity generation, and $E_{PV}{}^t$ indicates the prediction amount of PV electricity generation at the time t.

X8 indicates the SOC (state of charge) of the rechargeable battery, and $X8^t$ indicates the SOC of the rechargeable battery at the time t. Thus, $X8^t - X8^{t+1}$ indicates the amount of discharge of the rechargeable battery in the time period from the time t to the time t+1.

$H_R$ indicates the rated refrigeration amount of an electric freezer.

$COP_R$ indicates the COP (coefficient of power; performance coefficient), and $COP_R{}^t$ indicates the COP of an electric freezer at the time t.

$X5^t$ indicates the load rate of an electric freezer.

$E_{DEMAND}$ indicates the prediction amount of electric power consumed by an electric power consuming equipment, and $E_{DEMAND}{}^t$ indicates the prediction amount of electric power consumed by an electric power consuming equipment at the time t.

Equation (4) indicates the supply-and-demand relationship of gas.

[Equation 4]

$$GAS^t = GAS_{CGS} \cdot X6^t + GAS_{ABR-CG} \cdot X3^t + GAS_{ABR-HG} \cdot X4^t \quad \text{Equation (4)}$$

In the above, $GAS_{CGS}$ indicates the rated amount of gas used by a co-generation system.

$GAS_{ABR-CG}$ indicates the rated amount of gas used by an absorption-type water cooling/heating machine when generating cold water.

X3 indicates the load rate of an absorption-type water cooling/heating machine when using gas to generate cold water, and $X3^t$ is the load rate of an absorption-type water cooling/heating machine when using gas to generate cold water at the time t.

$GAS_{ABR-HG}$ indicates the rated amount of gas used by an absorption-type water cooling/heating machine when generating hot water.

X4 indicates the load rate of an absorption-type water cooling/heating machine when using gas to generate hot water, and $X4^t$ is the load rate of an absorption-type water cooling/heating machine when using gas to generate hot water at the time t.

Equation (5) indicates the supply-and-demand relationship of heating and cooling.

[Equation 5]

$$H_{ABR-CH} \cdot X2^t + H_{ABR-CG} \cdot X3^t + H_R \cdot X5^t + (X7^t - X7^{t+1}) = HC_{DEMAND}{}^t \quad \text{Equation (5)}$$

In the above, $H_{ABR-CH}$ indicates the rated refrigeration amount of an absorption-type water cooling/heating machine when generating cold water using exhaust heat from a co-generation system.

X2 indicates the load rate of an absorption-type water cooling/heating machine when generating cold water using exhaust heat from a co-generation system, and $X2^t$ indicates the load rate of an absorption-type water cooling/heating machine when generating cold water using exhaust heat from a co-generation system at the time t.

$H_{ABR-CG}$ indicates the rated refrigeration amount of an absorption-type water cooling/heating machine when generating cold water using gas.

X7 indicates the remaining amount of stored heat in a heat storage tank, and $X7^t$ indicates the remaining amount of stored heat in a heat storage tank at the time t. Therefore, $X7^t - X7^{t+1}$ indicates the amount of stored and radiated heat in a heat storage tank during the time from the time t to the time t+1.

$HC_{DEMAND}$ indicates the forecast consumption amount of cooling and heating of a cooling/heating consuming equipment and $HC_{DEMAND}{}^t$ indicates the forecast consumption amount of cooling and heating of a cooling/heating consuming equipment at the time t.

Equation (6) indicates the supply-and-demand relationship of heating.

[Equation 6]

$$H_{CGS} \cdot X6^t + H_{ABR-HG} \cdot X4^t > H_{ABR-IN} \cdot X2^t + HH_{DEMAND}{}^t \quad \text{Equation (6)}$$

In the above, $H_{CGS}$ indicates the rated amount of heat exhausted by a co-generation system.

$H_{ABR-HG}$ indicates the rated amount of heat exhausted by an absorption-type water cooling/heating machine when using gas to generate hot water.

$H_{ABR-IN}$ indicates the rated amount of heat exhausted and taken from a co-generation system when using the heat exhausted by an absorption-type water cooling/heating machine to generate hot water.

$HH_{DEMAND}$ indicates the predicted amount of heat consumed by heat-consuming equipment and $HH_{DEMAND}{}^t$ indicates the predicted amount of heat consumed by heat-consuming equipment at the time t.

The inequality symbol is used in Equation (6) because a co-generation system usually generates electricity based on a required electrical power and discards the excessive exhaust heat.

Equation (7) indicates the upper limit of the change per unit time of the stored heat amount in a heat storage tank.

[Equation 7]

$$|X7^t - X7^{t+1}| \leq FL_{Hs} \quad \text{Equation (7)}$$

In the above, $FJ_{Hs}$ indicates the maximum stored and released heat of a heat storage tank.

Equation (8) indicates the upper limit of the change per unit time of the stored electric power in a rechargeable battery.

[Equation 8]

$$|X8^t - X8^{t+1}| \leq FL_{Bat} \quad \text{Equation (8)}$$

In the above, $FL_{Bat}$ indicates the maximum amount of heat released by a rechargeable battery.

Equation (9) indicates the definition of the electric power coefficient in the present embodiment.

[Equation 9]

$$E_C{}^t = E_{CHG}{}^t + INC \quad \text{Equation (9)}$$

In the above, $E_{CHG}{}^t$ is the metered unit price at the time t. INC is the incentive unit price. The incentive, contrary to the electricity fee is paid from the electric power supplier to the electric power consumer, the incentive unit price is a negative value. By Equation (9), the incentive unit price is taken in consideration in the electricity fee.

Equation (3) to Equation (9) represent the energy flow of FIG. 2. Equation (7) and Equation (8) are the limiting equations of the capacity of the control target equipment 2.

X1 to X8 are parameters in the optimization. That is, the reduction information calculator 135 determines the values of X1 to X8 for each time t so that the value of the target function indicated in Equation (2) is minimized.

The values of X1 to X8 at each time t indicate the operating plan of each equipment. The details of X1 to X8 are shown in Table 1.

TABLE 1

| VARIABLE NAME | PHYSICAL QUANTITY | UPPER/LOWER LIMIT VALUES | UNITS |
|---|---|---|---|
| X1 | RECEIVED ELECTRICAL POWER AMOUNT | $0 \leq X1 \leq$ BASELINE | [kWh] |
| X2 | ABSORPTION-TYPE WATER COOLING/ HEATING MACHINE LOAD RATE (EXHAUST HEAT INTAKE MODE) | LOWER LIMIT $\leq X2 \leq 1$ | — |
| X3 | ABSORPTION-TYPE WATER COOLING/ HEATING MACHINE LOAD RATE (COLD WATER PRODUCTION USING GAS) | LOWER LIMIT $\leq X3 \leq 1$ | — |
| X4 | ABSORPTION-TYPE WATER COOLING/ HEATING MACHINE LOAD RATE (HOT WATER PRODUCTION USING GAS) | LOWER LIMIT $\leq X4 \leq 1$ | — |
| X5 | ELECTRIC FREEZER LOAD RATE | LOWER LIMIT $\leq X5 \leq 1$ | — |
| X6 | CGS LOAD RATE | LOWER LIMIT $\leq X6 \leq 1$ | — |
| X7 | REMAINING STORED HEAT | $0 \leq X7 \leq$ HEAT STORAGE CAPACITY | [kWh] |
| X8 | SOC | $0 \leq X8 \leq$ STORAGE BATTERY CAPACITY | [kWh] |

The lower limit values of X2 to X6 are determined by the specifications of the equipments.

The upper and lower limit values indicated in Table 1, together with Equation (2) to Equation (9), are restricting conditions in optimization.

The formulations shown in Equation (2) to Equation (9) and Table 1 are examples, and the equations used for optimization by the reduction information calculator 135 are not restrictive thereto.

When the operating schedule minimizing Equation (2) that is the target function is determined, the reduction information calculator 135 calculates the reduction amount of the received electric power from the baseline, based on Equation (10).

[Equation 10]

$$\sum_{t=ts}^{te} [BL^t - X1^t] \quad \text{Equation (10)}$$

In the above, BL indicates the baseline.

The information acquisition 131 stores the operating schedule determined by the reduction information calculator 135 into the optimized data storage 122, in association with the reduction amount of the received electric power and the incentive unit price.

After step S3, the incentive unit price setter 134 changes the incentive unit price (step S4). The incentive unit price setter 134 then judges whether or not the incentive unit price after the change is at or above a pre-set incentive unit price upper limit value (step S5).

If the judgment is that the incentive unit price is less than the upper limit value (YES at step S5) return is made to step S3. In this case, the reduction information calculator 135 optimizes the operating plan for the incentive unit price after the change.

As a method for changing the incentive unit price at step S3, various methods, such as the method of changing the incentive unit price in uniform steps and the method of changing the incentive unit price based on the received power reduction amount, can be used.

First, the method of changing the incentive unit price in uniform steps will be described.

Figure 6:
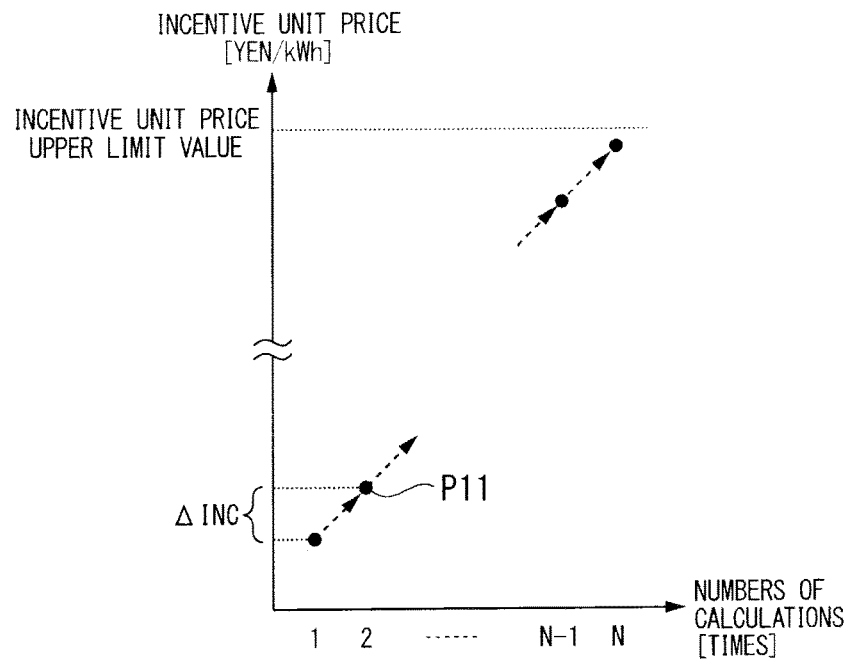
FIG. 6 is a graph showing an example of the trend in the incentive unit price for the case in which the incentive unit price setter changes the incentive unit price in uniform steps in the first embodiment.

FIG. 6 is a graph showing an example of the trend in the incentive unit price when the incentive unit price setter 134 changes the incentive unit price in uniform steps, in which the horizontal axis represents the number of the instances of optimization computation and the vertical axis represents the incentive unit price. For example, the point P11 at the position "2" on the horizontal axis indicates the incentive unit price when the reduction information calculator 135 performs the second optimization computation.

In the example of FIG. 6, the incentive unit price setter 134 successively increases the incentive unit price by a pre-set change amount of ΔINC each time. The incentive unit price setter 134 repeats the changing of the incentive unit price until the incentive unit price exceeds an upper limit value.

The incentive unit price setter 134 can change the incentive unit price by the simple calculation of adding a prescribed change amount ΔINC to the currently set value of the incentive unit price.

Next, the method of switching the change amount of the incentive unit for the case in which the received power reduction amount changes will be described.

Figure 7:
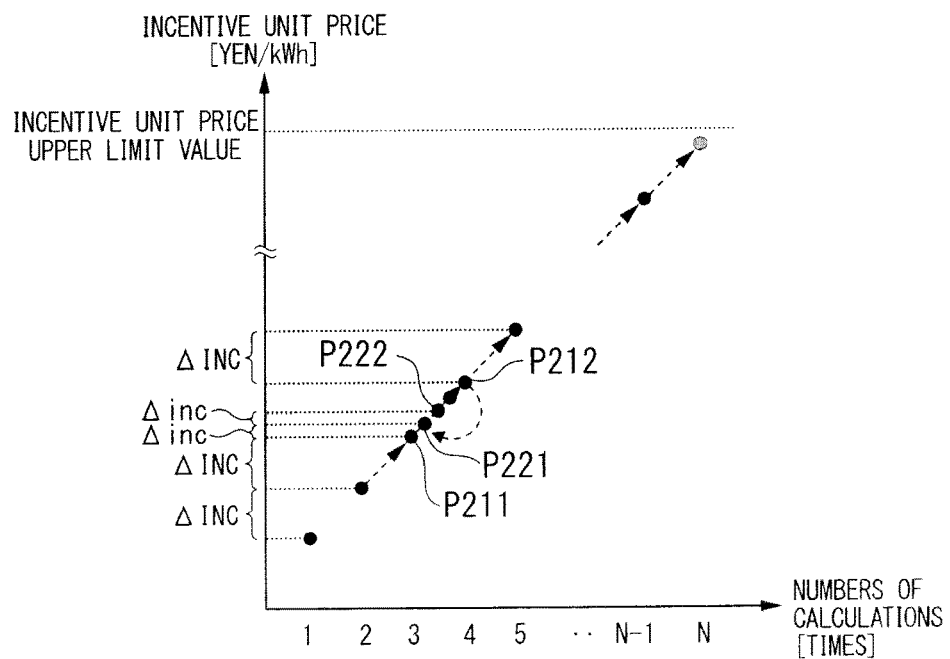
FIG. 7 is a graph showing an example of the trend in the incentive unit price for the case in which the incentive unit price setter switches the incentive unit price in the first embodiment.

FIG. 7 is a graph showing an example of the trend in the incentive unit price for the case in which the incentive unit price setter 134 switches the incentive unit price, in which the horizontal axis represents the number of the instances of optimization of the incentive unit price with the change amount ΔINC, and the vertical axis represents the incentive unit price.

In the example of FIG. 7, the incentive unit price setter 134, similar to the case of FIG. 6, successively increases the incentive unit price by a pre-set change amount of ΔINC each time. The incentive unit price setter 134 repeats the changing of the incentive unit price by the change amount ΔINC until the incentive unit price exceeds an upper limit value.

In the example of FIG. 7, with regard to the zone in which the electric power reduction amount is changed, the setting of the incentive unit price is redone by switching to a change amount Δinc that is pre-set to be smaller than the change amount ΔINC.

Specifically, the electric power reduction amount obtained by the second optimization computation is the same as the electric power reduction amount obtained at the first optimization computation, and the incentive unit price setter 134 increases the incentive unit price by the change amount ΔINC, as shown by point P211. The reduced power amount obtained by the third optimization computation is also the same as that of the second optimization computation, and the incentive unit price setter 134 increases the incentive unit price by the change amount ΔINC, as shown by point P212.

However, the electric power reduction amount obtained by the fourth optimization computation differs from the electric power reduction amount obtained by the third optimization computation. Given this, the incentive unit price setter 134 interrupts the processing that increases the incentive unit price by the change amount ΔINC each time and, at points P221, P222, and so on, increases the incentive unit price by the change amount Δinc each time, within a range from the incentive unit price used in the third optimization computation up to the incentive unit price used in the fourth optimization computation.

When the incentive unit price reaches the incentive unit price used in the fourth optimization computation, the incentive unit price setter 134 restarts processing to increase the incentive unit price by the change amount ΔINC each time.

After the above, each time the electric power reduction amount changes, the incentive unit price setter 134 interrupts the processing that increases the incentive unit price by the change amount ΔINC each time and resets the incentive unit price with the change amount Δinc during that zone.

Next, the operation when the incentive unit price setter 134 switches the incentive unit price will be described, with references made to FIG. 8.

Figure 8:
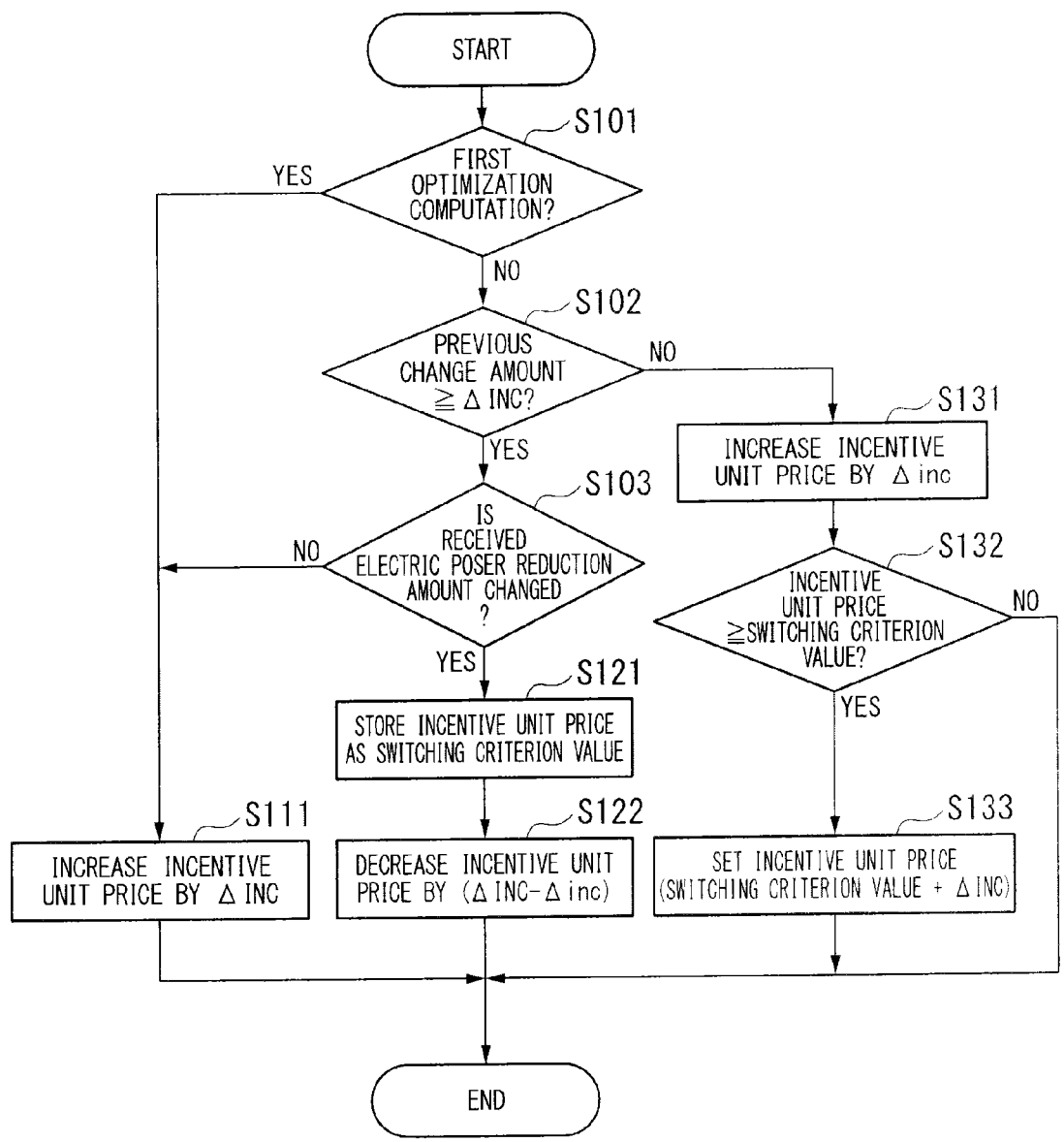
FIG. 8 is a flowchart showing the processing procedure for the case in which the incentive unit price setter switches the incentive unit price in the first embodiment.

FIG. 8 is a flowchart showing the processing procedure for the case in which the incentive unit price setter 134 switches the incentive unit price. The incentive unit price setter 134 performs the processing of FIG. 8 at step S4 of FIG. 5.

In the processing of FIG. 8, the incentive unit price setter 134 first judges whether or not the optimization computation performed immediately previously by the reduction information calculator 135 was the first optimization computation (step S101).

If the judgment is that it is the first optimization computation (YES at step S101), the incentive unit price setter 134 increases the incentive unit price by the change amount ΔINC (step S111).

After the above, the processing of FIG. 8 ends.

If, however, at step S101 the judgment is that it is not the first optimization computation (NO at step S101), the incentive unit price setter 134 judges whether or not the change amount of the incentive unit price in the processing at step S4 of FIG. 5 the previous time was greater than ΔINC (step S102).

If the judgment is that the change amount was greater than ΔINC (YES at step S102), the incentive unit price setter 134 judges whether or not the received electric power reduction amount in the immediately previous optimization computation performed by the reduction information calculator 135 has changed from the received electric power reduction amount in the optimization computation immediately previous thereto (step S103).

If the judgment is that the received electric power reduction amount has changed (YES at step S103), the incentive unit price setter 134 sets the incentive unit price set by the processing at step S4 of FIG. 5 the previous time as the switching criterion value (step S121).

The incentive unit price setter 134 then reduces the incentive unit price by the amount (ΔINC−Δinc) (step S122). That is, the incentive unit price setter 134 returns to the incentive unit price set by the processing of step S4 of FIG. 5 two times ago and, because the optimization computation with the incentive unit price has already been done, increases the incentive unit price by Δinc.

After step S122, the processing of FIG. 8 ends.

If, however, the judgment at step S103 is that the received electric power reduction amount has not changed (NO at step S103), return is made to step S111.

If the judgment at step S102 is that the change amount of the incentive unit price in the processing of step S4 of FIG. 5 the previous time was less than ΔINC (NO at step S102), the incentive unit price setter 134 increases the incentive unit price by the amount Δinc (step S131).

The incentive unit price setter 134 then judges whether or not the incentive unit price is greater than the switching criterion value (step S132). The switching criterion value is the value stored at step S121).

If the judgment is that the incentive unit price is greater than the switching criterion value (YES at step S132), the incentive unit price setter 134 sets the incentive unit price to the switching criterion value plus ΔINC (step S133). That is, the incentive unit price setter 134 returns to the incentive unit price before the change in the change amount and, because the optimization computation with the incentive unit price has already been done, increases the incentive unit price by the amount ΔINC.

After step S133, the processing of FIG. 8 ends.

If, however, the judgment at step S132 is that the incentive unit price was lower than the switching criterion value (NO at step S132), the processing of FIG. 8 ends.

By the above processing, the incentive unit price setter 134 switches the incentive unit price change amount and makes the change amount smaller, for a range in which the received electric power reduction amount changes with a large change amount. Doing this, the incentive unit price setter 134 can, by the relatively simple processing of switching the incentive unit price in two steps, efficiently change the incentive unit price in the optimization processing.

By doing this, in a region in which there is no change in the electric power reduction amount, the received electric power reduction information calculation apparatus 100 can reduce the amount of calculation by the reduction information calculator 135. In contrast, in a region in which there is a change in the power reduction amount, the received electric power reduction information calculation apparatus 100 can obtain a more detailed relationship between the incentive unit price and the received power reduction amount. Regarding this point, when a certain power reduction amount is expected, the received electric power reduction information calculation apparatus 100 can efficiently extract the minimum incentive unit price at which it is difficult for the electric power consumer to suffer a loss.

Next, the method of changing the change amount of the incentive unit price in stepwise fashion in the case in which the receiver electric power reduction amount changes will be described.

Figure 9:
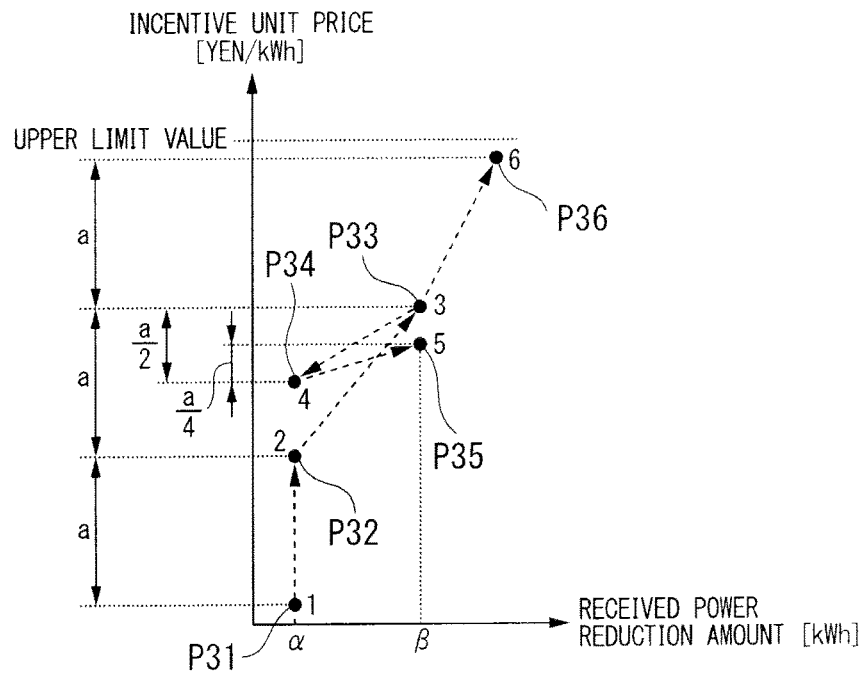
FIG. 9 is a graph showing a first example of the trend in the incentive unit price for the case in which the incentive unit price setter varies the change amount of the incentive unit price in stepwise fashion in the first embodiment.

FIG. 9 is a graph showing a first example of the trend in the incentive unit price for the case in which the incentive unit price setter 134 changes the change amount of the incentive unit price in stepwise fashion, in which the horizontal axis represents the electric power reduction amount and the vertical axis represents the incentive unit price. The numbers applied at each point represent the number of the instances of optimization computation.

For example, the number 1 applied to point P31 indicates the incentive unit price and the obtained electric power reduction amount when the reduction information calculator 135 performs the optimization computation the first time.

In the example of FIG. 9, the incentive unit price setter 134 successively increases the incentive unit price by a pre-set change amount a each time. The change amount a is set to a value greater than that of the pre-set change amount ΔINC.

The incentive unit price setter 134 repeats this until the received electric power reduction amount obtained in optimization by the reduction information calculator 135 changes, or until the incentive unit price in step S5 of FIG. 5 exceeds an upper limit value.

If the received electric power reduction amount has changed, the incentive unit price setter 134 successively reduces the incentive unit price by a/2, a/4, a/8, . . . , $a/2^i$ (where i is a positive integer) each time. The incentive unit price setter 134 repeats this until the received electric power reduction amount is the same as the received electric power reduction amount before the change, or until the difference between the incentive unit price and the incentive unit price before the change in the received electric power reduction amount is smaller than the change amount ΔINC.

If the difference between the incentive unit price and the incentive unit price before the change in the received electric power reduction amount becomes smaller than the change amount ΔINC, the incentive unit price setter 134 increases from the incentive unit price before the reduction by the amount of the change amount a, the same as noted above.

In this manner, the incentive unit price setter 134 repeats the increase and reduction of the incentive unit price and the reduction information calculator 135 performs optimization computations for each incentive unit price set by the incentive unit price setter 134.

In the example of FIG. 9, as shown by point P31, the received electric power reduction amount obtained on the first optimization computation is α. After the first optimization computation, the incentive unit price setter 134 adds the change amount a to the incentive unit price. The reduction information calculator 135 then performs the second optimization computation. As shown by point P32, the received electric power reduction amount obtained by the second optimization computation is α, the same as the first time.

Because the received electric power reduction amount remains α with no change, the incentive unit price setter 134 adds the change amount a to the incentive unit price. The reduction information calculator 135 then performs the third optimization computation. As shown by point P33, the received electric power reduction amount obtained by the third optimization computation is β.

Because the received electric power reduction amount changed from α to β, the incentive unit price setter 134 subtracts the change amount a/2 from the incentive unit price. The reduction information calculator 135 then performs a fourth optimization computation. As shown by point P34, the received electric power reduction amount obtained by the fourth optimization computation is β, the same as the third time.

Because the obtained received electric power reduction amount differs from a (the value before the change), the incentive unit price setter 134 subtracts the change amount a/4 from the incentive unit price. The reduction information calculator 135 then performs the fifth optimization computation. As shown by point P35, the received electric power reduction amount obtained by the fifth optimization computation is β, the same as the third time.

The difference a/4 between the incentive unit price at the time of the fifth optimization computation and the incentive unit price at the time of the second optimization computation (optimization computation before the change of the received electric power reduction amount) is smaller than the change amount ΔINC.

Given this, the incentive unit price setter 134 makes an increase of the change amount a from the incentive unit price (incentive unit price before the decrease) when the third optimization computation, indicated by point P33. The reduction information calculator 135 then performs the sixth optimization computation shown by point P36.

In contrast, if the incentive unit price is decreased and the received electric power reduction amount becomes the same as the received electric power reduction amount before the change, the incentive unit price setter 134 increases the incentive unit price by one-half of the reduction width of the incentive unit price on the immediately previous time. After that, the incentive unit price setter 134 successively increases the incentive unit price while reducing the increase width. The incentive unit price setter 134 repeats this until the received electric power reduction amount is the same as the received electric power reduction amount after the change or until the difference between the incentive unit price and the incentive unit price after the change in the received electric power reduction amount becomes smaller than the change amount ΔINC.

If the received electric power reduction amount is the same as the received electric power reduction amount after the change or the difference between the incentive unit price and the incentive unit price after the change in the received electric power reduction amount has become smaller than the change amount ΔINC, the incentive unit price setter 134 makes an increase of the change amount a from the incentive unit price before the reduction.

In this manner, the incentive unit price setter 134 repeats the increase and reduction of the incentive unit price and the reduction information calculator 135 performs optimization computations for each incentive unit price set by the incentive unit price setter 134.

Figure 10:
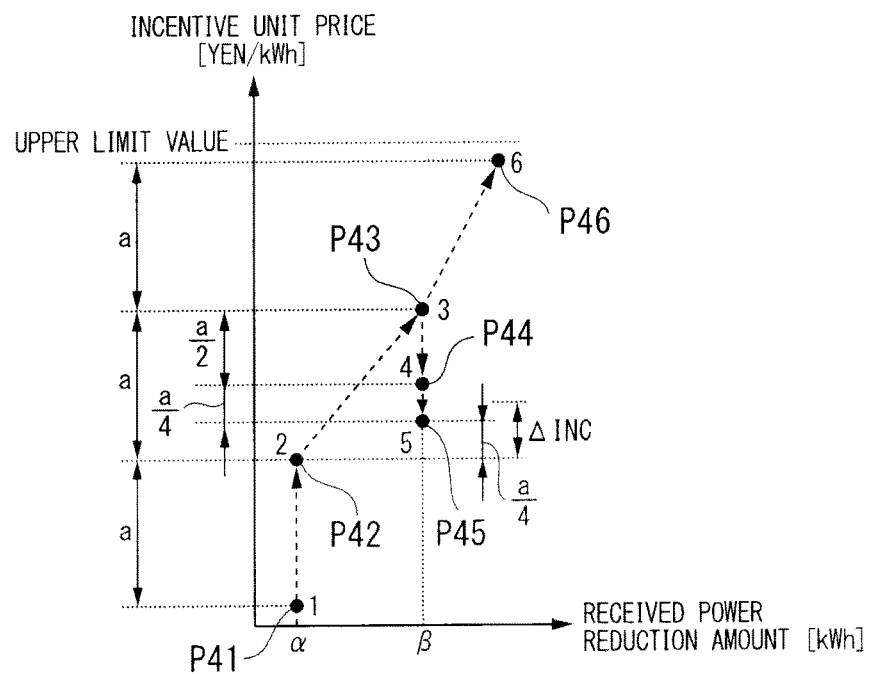
FIG. 10 is a graph showing a second example of the trend in the incentive unit price for the case in which the incentive unit price setter varies the change amount of the incentive unit price in stepwise fashion in the first embodiment.

FIG. 10 is a graph showing a second example of the trend in the incentive unit price for the case in which the incentive unit price setter 134 varies the change amount of the incentive unit price in stepwise fashion. In FIG. 10, the same as in FIG. 9, the horizontal axis represents the electric power reduction amount and the vertical axis represents the incentive unit price. The numbers applied at each point represent the number of the instances of optimization computation.

In the example of FIG. 10, the first optimization computation to the third optimization computation indicated by points P41 to P43 are similar to the first optimization computation to the third optimization computation indicated by points P31 to P33 in the example of FIG. 9.

In contrast, in the fourth optimization computation indicated by point P44 in FIG. 10, different from the case of the fourth optimization computation indicated by point P34 in the example of FIG. 9, the obtained received electric power reduction amount is the same α as the second time (before the change in the received electric power reduction amount).

Because the obtained received electric power reduction amount is the same as a (value before the change), the incentive unit price setter 134 add the change amount of a/4 (one-half of the reduction width after the immediately previous (third) optimization computation) to the incentive unit price.

The reduction information calculator 135 then performs the fifth optimization computation. As shown by point P45, the received electric power reduction amount obtained by the fifth optimization computation is the same β as the third time.

Given this, the incentive unit price setter 134 makes an increase of the change amount a from the incentive unit price when the third optimization computation, indicated by point P43 (incentive unit price before the reduction). The reduction information calculator 135 then performs the sixth optimization computation shown by point P46.

Next, referring to FIG. 11 and FIG. 12, the operation of the incentive unit price setter 134 changing the incentive unit price change amount in stepwise fashion will be described.

Figure 11:
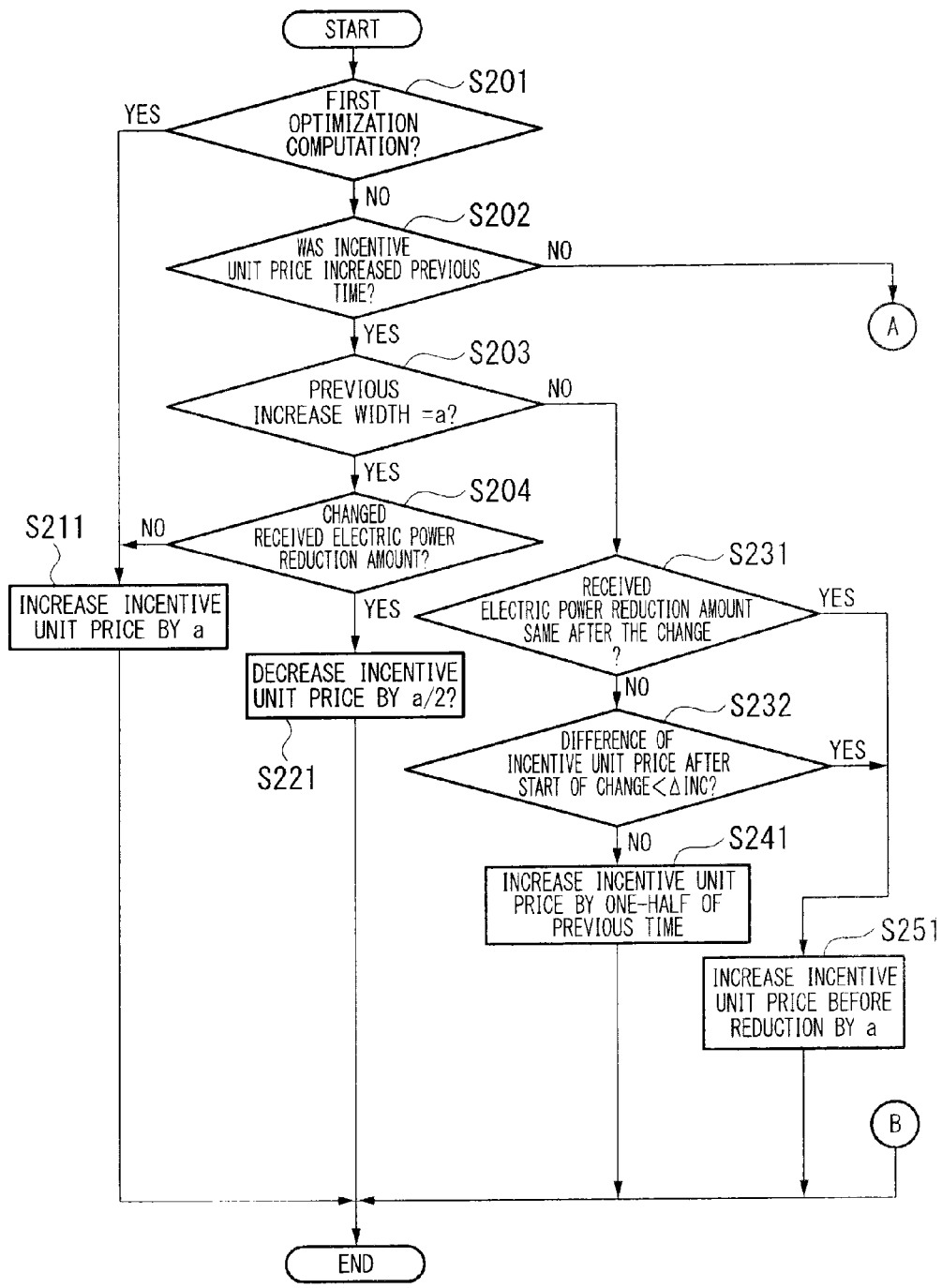
FIG. 11 is a flowchart showing the processing procedure for the case in which the incentive unit price setter varies the change amount of the incentive unit price in stepwise fashion in the first embodiment.
Figure 12:
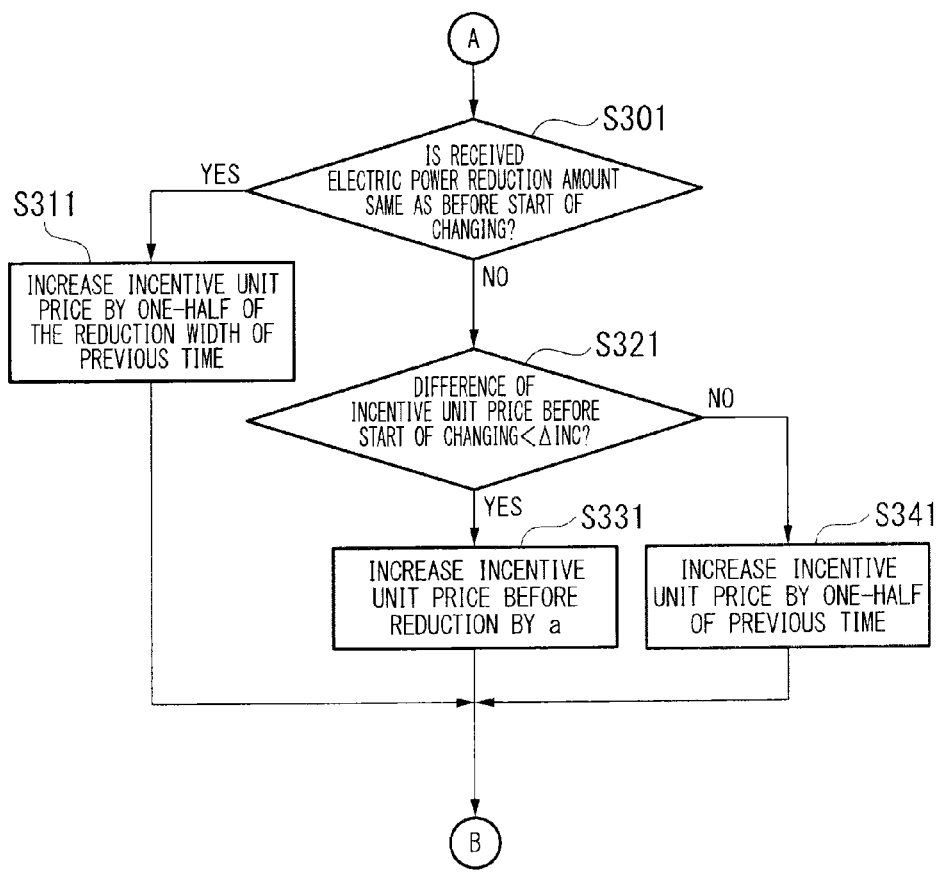
FIG. 12 is a flowchart showing the processing procedure for the case in which the incentive unit price setter varies the change amount of the incentive unit price in stepwise fashion in the first embodiment.

FIG. 11 and FIG. 12 are flowcharts showing the processing procedure for the case in which the incentive unit price setter 134 varies the change amount of the incentive unit price in stepwise fashion. The incentive unit price setter 134 performs the processing of FIG. 11 and FIG. 12 at step S4 in FIG. 5.

In the processing of FIG. 11, the incentive unit price setter 134 first judges whether or not the optimization computation performed immediately previously by the reduction information calculator 135 was the first optimization computation (step S201).

If the judgment is that it is the first optimization computation (YES at step S201), the incentive unit price setter 134 increases the incentive unit price by the change amount a (step S211).

After the above, the processing of FIG. 11 and FIG. 12 ends.

If, however, at step S201 the judgment is that it is not the first optimization computation (NO at step S201), the incentive unit price setter 134 judges whether or not the incentive unit price was increased in the processing at step S4 of FIG. 5 the previous time (step S202).

If the judgment is that the incentive unit price was increased (YES at step S202), the incentive unit price setter 134 judges whether or not the increase width of the incentive unit price in the processing of step S4 of FIG. 5 the previous time was a (step S203).

If the judgment is made that the change amount was a (YES at step S203), the incentive unit price setter 134 judges whether or not the received electric power reduction amount in the immediately previous optimization computation performed by the reduction information calculator 135 was changed from the received electric power reduction amount obtained in the immediately previous optimization computation (step S204).

If the judgment is that the received electric power reduction amount had changed (YES at step S204), the incentive unit price setter 134 decreases the incentive unit price by the amount of the change amount a/2 (step S221). After that, the processing of FIG. 11 and FIG. 12 ends.

If, however, at the step S204, the judgment is that the received electric power reduction amount did not change (NO at step S204), processing proceeds to step S211.

If, however, at step S203, the judgment is that the increase width was not a, (NO at step S203), the incentive unit price setter 134 judges whether or not received electric power reduction amount in the immediately previous optimization computation performed by the reduction information calculator 135 is the same as the received electric power reduction amount after the change (step S231). In this case, the received electric power reduction amount after the change is the received electric power reduction amount when the judgment is made in step S204 that the received electric power reduction amount had changed (the immediately previous judgment if there is a plurality of judgments).

If the judgment is that the received electric power reduction amount is the same as the received electric power reduction amount after the change (YES at step S231), the incentive unit price setter 134 causes a change of the incentive unit price to increase it by the change amount a from the incentive unit price before the reduction (step S251). The incentive unit price before the reduction is the incentive unit price calculated in the immediately previous processing of the processing to increase the incentive unit price at step S4 of FIG. 5.

After step S251, the processing of FIG. 11 and FIG. 12 ends.

If, however, the judgment at step S231 is that the received electric power reduction amount is different from the received electric power reduction amount after the change (NO at step S231), the incentive unit price setter 134 judges whether or not the difference between the incentive unit price after the change in the received electric power reduction amount and the current incentive unit price is smaller than $\Delta INC$ (step S232). The incentive unit price after the change in the received electric power reduction amount is the incentive unit price when the judgment is made in step S204 that the received electric power reduction amount had changed (the immediately previous judgment if there is a plurality of judgments).

If the judgment is that the difference is smaller than $\Delta INC$ (YES at step S232), processing proceeds to step S251.

If, however, the judgment is that the difference is greater than $\Delta INC$ (NO at step S232), the incentive unit price setter 134 increases the incentive unit price by an amount that is one-half of the increase width at step S4 in FIG. 5 the previous time (step S241). After that, processing of FIG. 11 and FIG. 12 ends.

However, if the judgment at step S202 is that the incentive unit price has not been increased by the processing of step S4 in FIG. 5 the previous time (NO at step S202), the incentive unit price setter 134 judges whether or not the received electric power reduction amount is the same as before start of changing the received electric power reduction amount (step S301 (FIG. 12)). Before the start of changing the received electric power reduction amount as used herein is the timing at which the received electric power reduction amount in the optimization computation performed by the reduction information calculator 135 was the same as the received electric power reduction amount in the optimization computation of the previous time. If there is a plurality of such timings, this refers to the immediately previous of such timings. If there is no corresponding timing, the timing is taken to be the time at which the reduction information calculator 135 performs the first optimization computation.

If the judgment is made that the received electric power reduction amount is the same as before the start of changing the received electric power reduction amount (YES at step S301), the incentive unit price setter 134 increases the incentive unit price by one-half of the reduction width of the incentive unit price at step S4 in FIG. 5 of the previous time (step S311). After that, the processing of FIG. 11 and FIG. 12 ends.

If, however, the judgment at step S301 is that the received electric power reduction amount differs from before the start of changing the received electric power reduction amount (NO at step S301), the incentive unit price setter 134 judges whether or not the difference between the incentive unit price before the start of changing the received electric power reduction amount and the current incentive unit price is smaller than $\Delta INC$ (step S321).

If the difference is judged to be smaller than $\Delta INC$ (YES at step S321), the incentive unit price setter 134 makes an increase of the change in the incentive unit price of the amount of the change amount a from the incentive unit price before the reduction (step S331).

After the above, the processing of FIG. 11 and FIG. 12 ends.

If, however, the judgment at step S321 is that the difference is greater than ΔINC (NO at step S321), the incentive unit price setter 134 decreases the incentive unit price by an amount that is one-half of the reduction width at the step S4 of FIG. 5 the previous time (step S341).

After the above, the processing of FIG. 11 and FIG. 12 ends.

By the above processing, the incentive unit price setter 134 makes the change amount of the incentive unit price in a zone in which the electric power reduction amount does not change large. In contrast, in a zone in which the electric power reduction amount changes, the incentive unit price setter 134 makes the change amount of the incentive unit price small.

In a zone in which there is no change in the electric power reduction amount, this enables the received electric power reduction information calculation apparatus 100 to reduce the amount of calculations by the reduction information calculator 135. In contrast, in a zone in which there is a change in the electric power reduction amount, the received electric power reduction information calculation apparatus 100 can obtain a more detailed relationship between the incentive unit price and the received electric power reduction amount. Regarding this point, when a certain power reduction amount is expected, the received electric power reduction information calculation apparatus 100 can efficiently extract the minimum incentive unit price at which it is difficult for the electric power consumer to suffer a loss.

If the judgment is made at step S5 in FIG. 5 that the incentive unit price after the change is larger than a pre-set incentive unit price upper limit value (NO at step S5), the output equipment 140 notifies the determiner of the bidding conditions of the received electric power reduction amount obtained by optimization computation by the reduction information calculator and also the incentive unit price (step S6).

Figure 13:
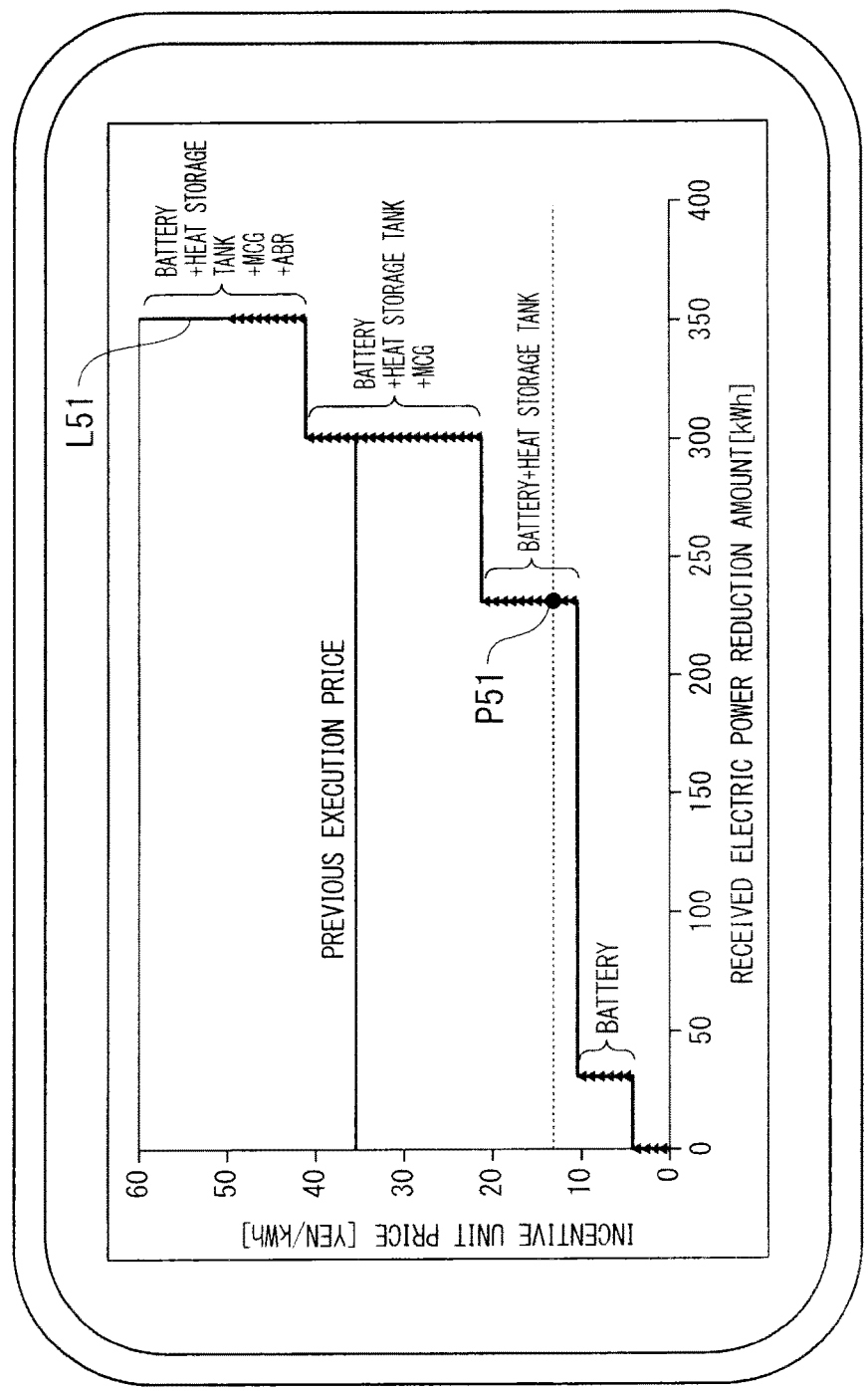
FIG. 13 is a descriptive drawing showing an example of the display screen displayed by the output equipment of the first embodiment.

FIG. 13 is a descriptive drawing showing an example of the display screen displayed by the output equipment 140. In the graph displayed by the output equipment 140 of the example of this drawing, the horizontal axis of represents the total received electric power reduction amount at the demand response target time and the vertical axis represents the incentive unit price. The graph shows the relationship between the received electric power reduction amount and the incentive unit price obtained by optimization computations performed repeatedly by the reduction information calculator 135.

The line L51 indicates the incentive unit price and the electric power reduction amount in the operating schedule obtained by the optimization computation performed by the reduction information calculator 135. In FIG. 13, ABR indicates an absorption-type water cooling/heating machine.

In the display screen of FIG. 13, past-agreed amount in the market the previous time and the equipment being used to achieve a reduction of electric power are indicated, along with point P51, at which the energy fee considering the incentive unit price indicated by the example of Equation (2) and the energy fee for the case of not performing reduction of the received electric power by demand response are equal (an incentive unit price=0 Yen/kWh).

For example, the operating cost of a battery is less than that of other equipments. For this reason, in operation using only a battery to reduce the received electric power, even if the incentive unit price is low, it can be expected that the electric power consumer will not take a loss.

In contrast, if a heat storage tank is used in addition to a battery, more reduction can be made to the received electric power reduction amount than the case of using only a battery. The operating cost of a heat storage tank, however, is higher than that of a battery. For this reason, in order for the electric power consumer not to take a loss in operation using a battery and a heat storage tank to reduce the received electric power, a higher incentive unit price is required than the case of using a battery alone.

Additionally, in operation using a co-generation system as well, it is possible to achieve an even greater received electric power reduction amount. However, burning gas to operate a co-generation system makes the operating cost high. For this reason, in order for the electric power consumer not to take a loss in operation using a battery, a heat storage tank, and a co-generation system to reduce the received electric power, a higher incentive unit price is required than the case of using a battery and a heat storage tank.

The equipments used for achieving an electric power reduction are indicated by variables X1 to X8 as operating schedules.

Thus, the amount that the received electric power can be reduced and the incentive unit price in order for the electric power consumer not to take a loss differ, depending upon the equipments used. The output equipment 140 indicating, as shown in the display screen in FIG. 13, the relationship between the received electric power reduction amount and the incentive unit price enables the electric power consumer to easily understand bidding conditions difficult to result in a loss, by making a bid of an incentive unit price that is higher than the operating point P51 and also a received electric power reduction amount and the incentive unit price that are on the line L51. This enables the electric power consumer to make a proper bid and operate equipments that achieve a profit.

The display 140 displays the amount of reduction of the received electric power calculated by the reduction information calculator 135 by the graph showing the relationship between the incentive unit price and the reduction amount of the received electric power.

This enables the user of the received electric power reduction information calculation apparatus 100 to easily understand the proper bidding conditions by calculating this graph.

The display 140 displays a graph of past-agreed amounts of the incentive unit price.

This enables a user of the received electric power reduction information calculation apparatus 100 to understand past-agreed amounts and to bid an amount that reflects the past-agreed amounts (for example, an incentive unit price that slightly exceeds a past-agreed amount). The user of the received electric power reduction information calculation apparatus 100, by bidding an amount that reflects a past-agreed amount, can expect a higher possibility of winning in the bidding.

<Second Embodiment>

Figure 14:
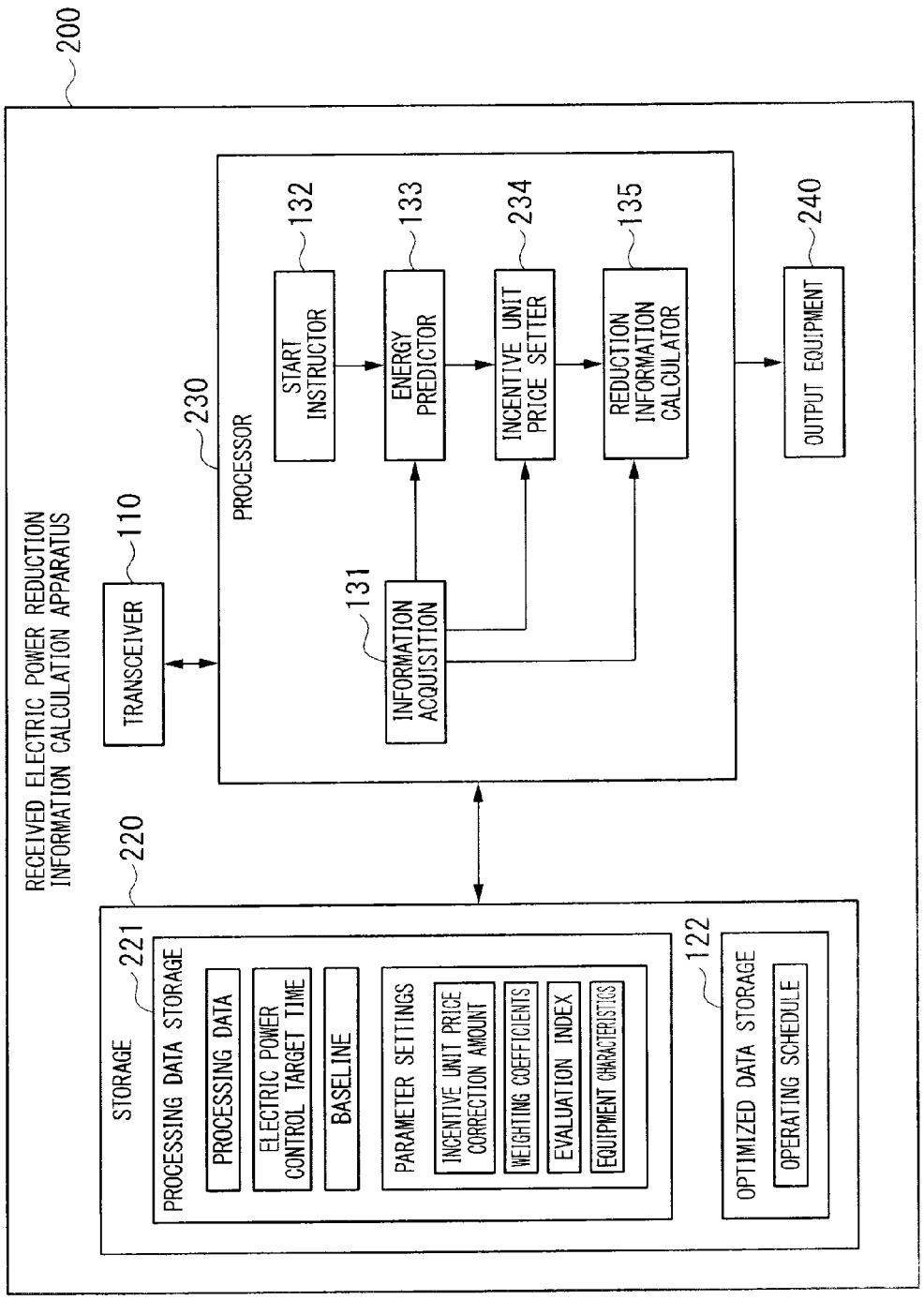
FIG. 14 shows the general functional constitution of a received electric power reduction information calculation apparatus of a second embodiment.

FIG. 14 shows the general functional constitution of a received electric power reduction information calculation apparatus 200. The received electric power reduction information calculation apparatus 200 has the transceiver 110, a storage 220, a processor 230, and an output equipment 240. The storage 220 has a processing data storage 221 and the optimized data storage 122. The processor 230 has the information acquisition 131, the start instructor 132, the energy predictor 133, an incentive unit price setter 234, and the reduction information calculator 135.

In FIG. 14 elements that correspond to and have the same functions as those in FIGS. 3 (110, 122, 131 to 133, and 135) are assigned the same reference numerals and the descriptions thereof will be omitted. The constitution of the monitoring and control system and the control target equipments of the present embodiment are the same as described for the first embodiment.

In the present embodiment, the method of setting the incentive unit price used by the incentive unit price setter 234 is different from that of the first embodiment. Accompanying this difference, the incentive unit price setter 234 does not repeat the setting of the incentive unit price. The processing data storage 221 stores parameters indicating an incentive unit price correction amount in place of the incentive unit price change amount and the upper limit value thereof. The output of the output equipment 240 also differs from the first embodiment.

Figure 15:
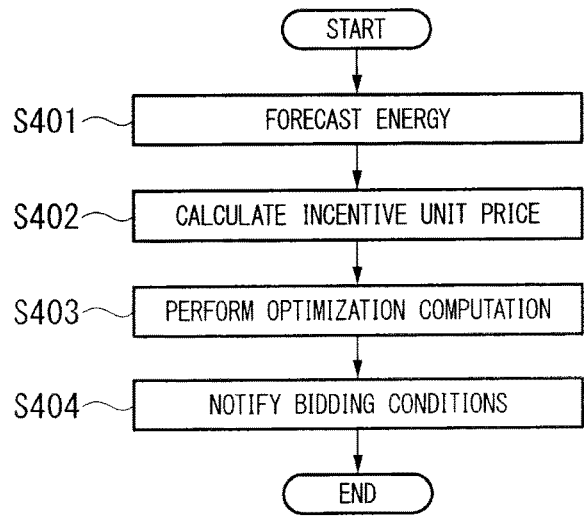
FIG. 15 is a flowchart showing the processing procedure for the received electric power reduction information calculation apparatus to calculate bidding conditions in demand response in the second embodiment.

FIG. 15 is a flowchart showing the processing procedure for the received electric power reduction information calculation apparatus 200 to calculate bidding conditions in demand response.

In this drawing, step S401 is the same as step S1 in FIG. 5.

At step S402, the incentive unit price setter 234 sets the electricity unit price based on Equation (11).

[Equation 11]

$$E_C{}^t = E_{CHG}{}^t + (INC_{CP} + inc) \qquad \text{Equation (11)}$$

In the above, $INC_{CP}$ (Yen/kilowatt-hour) indicates a past-agreed amount of the incentive unit price in the market the previous time. The inc (Yen/kilowatt-hour) indicates a correction amount for the incentive unit price. As described with regard to Equation (9), $E_{CHG}{}^t$ is the metered unit price of the electric power fee at the time t.

The past-agreed amount of the incentive unit price as used herein is the amount of the incentive unit price actually contract for in demand response. In a bidding-type demand response contract, the establishment of a past-agreed amount, in addition to a bid amount, is proposed. The past-agreed amount is set, for example, as the highest bid amount among the contracted bidders.

The term correction amount used herein is the difference amount for calculating an expected incentive unit price on the current bid from the past-agreed amount of the incentive unit price the previous time. For example, by setting the correction amount so that the electric power consumer reduces the incentive unit price slightly from the past-agreed amount of the previous time, it can be expected that winning in the bidding will become easier.

The correction amount may be input by the electric power consumer on each bid, or may be pre-set. For example, in the case of operation in which bidding each time is to be made 5 Yen below the past-agreed amount the previous time, the electric power consumer sets the correction amount to minus 5 Yen beforehand.

The sum of the execution incentive unit price amount the previous time and the correction amount is assumed to be the incentive unit price in the current bidding. The incentive unit price setter 234 makes the electricity unit price reflect the assumed amount of the incentive unit price in the current bidding, based on Equation (12).

At step S403, the reduction information calculator 135 optimizes the operating schedule of equipment, based on the electricity unit price set at step S402. The details of the processing at step S403 are the same as the case of step S3 of FIG. 5.

At step S404, the output equipment 240 makes notification of the bidding conditions obtained as a result of the optimization computation at step S403. For example, the output equipment 240 makes a screen display of the expected amount of the incentive unit price in the current budding and the received electric power reduction amount calculated by the reduction information calculator 135 based on the expected amount.

Figure 16:
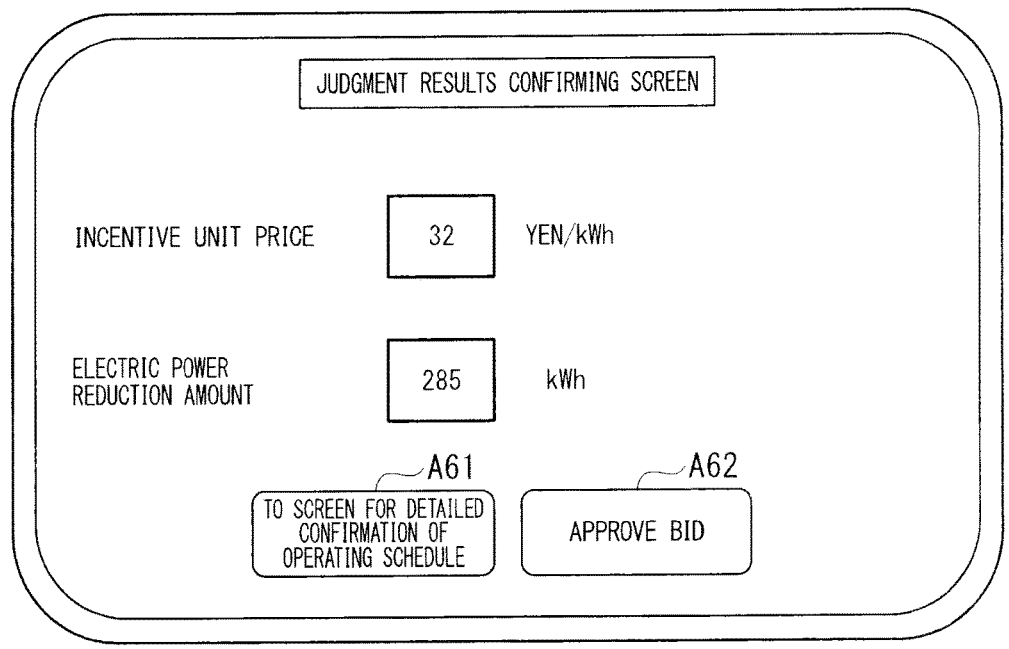
FIG. 16 is a descriptive drawing showing an example of the display screen displayed by the output equipment of the second embodiment.

FIG. 16 is a descriptive drawing showing an example of the display screen displayed by the output equipment 240. In this drawing, the display 240 displays the expected value of the incentive unit price this time, corrected by the execution value of the incentive unit price the previous time using the correction amount, and the received electric power reduction amount calculated by the reduction information calculator 135 based on the expected amount.

Additionally, the screen display of FIG. 16 also displays a touch region A61 for requesting the screen display of an operating schedule for achieving the displayed received electric power reduction amount and a touch region A62 for requesting a bid with the displayed conditions.

As described above, the incentive unit price setter 234 sets the incentive unit price based on the past-agreed amount of the incentive unit price the previous time and on the correction amount of the incentive unit price. Doing this, the incentive unit price setter 234 need not repeatedly set the incentive unit price, and the reduction information calculator 135 need not repeatedly perform the optimization computation. These points enable a reduction in the load on the processor 230.

The display 240 offers an incentive unit price that is the past-agreed amount of the incentive unit price the previous time, calculated by the incentive unit price setter 234 and corrected by the correction amount. This enables the output equipment 240 to offer bidding conditions that are more likely to attract a buyer in the market.

The display 240 presents a received electric power reduction amount obtained by the optimization computation performed by the reduction information calculator 135. Doing this enables the output equipment 240 to offer bidding conditions that offer promise of profit to the electric power consumer, in accordance with bidding-type demand response.

<Third Embodiment>

Figure 17:
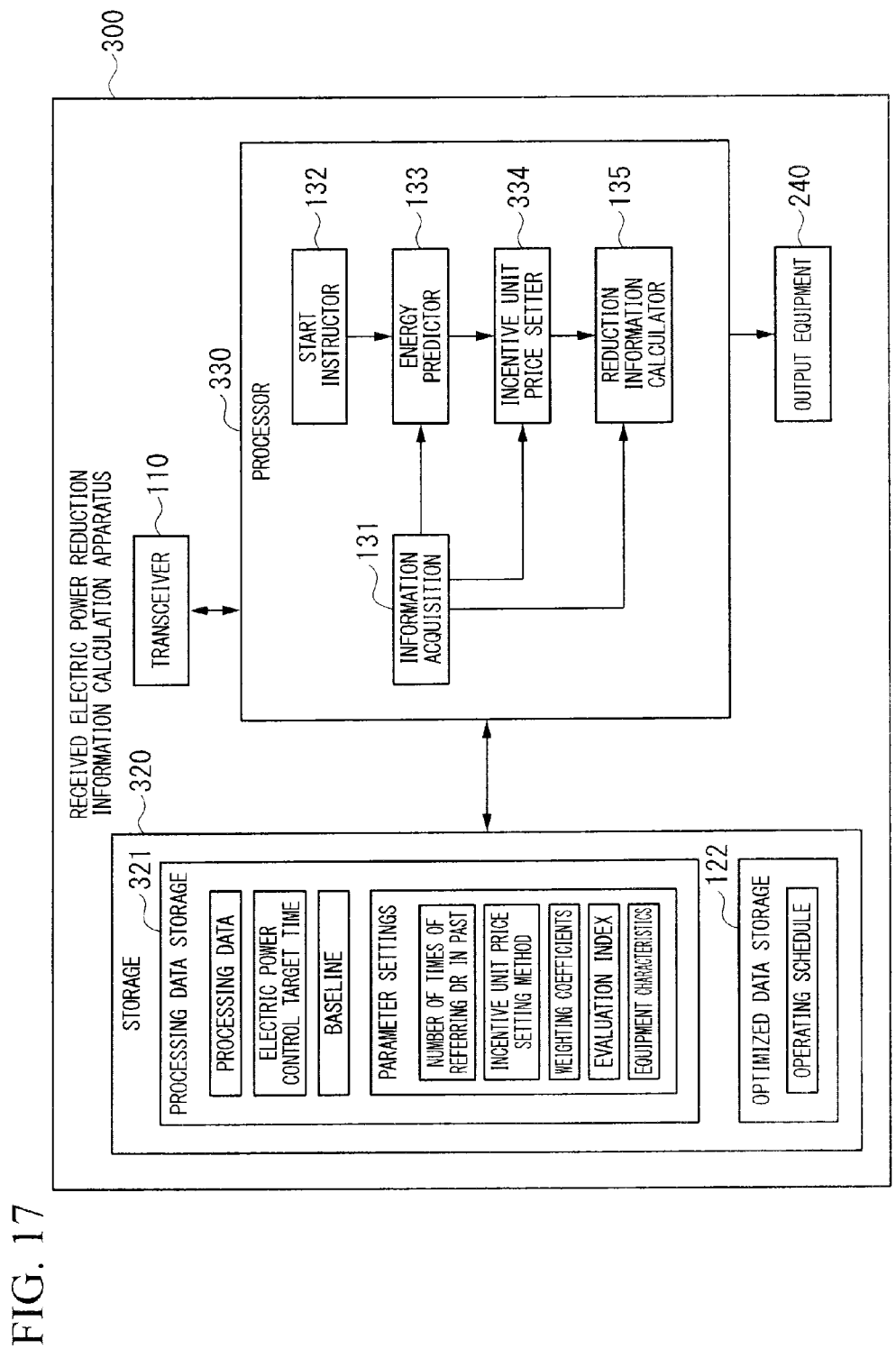
FIG. 17 shows the general functional constitution of a received electric power reduction information calculation apparatus of a third embodiment.

FIG. 17 shows the general functional constitution of a received electric power reduction information calculation apparatus 300. In this drawing, the received electric power reduction information calculation apparatus 300 has a transceiver 110, a storage 320, a processor 330, and the output equipment 240. The storage 320 has a processing data storage 321 and the optimized data storage 122. The processor 330 has the information acquisition 131, the start instructor 132, the energy predictor 133, an incentive unit price setter 334, and the reduction information calculator 135.

In FIG. 17, elements corresponding to and having the same functions as those in FIGS. 14 (110, 122, 131 to 133, 135, and 240) are assigned the same reference numerals and the descriptions thereof will be omitted. The constitution of the monitoring and control system and the control target equipment of the present embodiment are the same as described for the first embodiment.

In the present embodiment, the method of setting the incentive unit price used by the incentive unit price setter 334 is different from that of the second embodiment. Accompanying this difference, the processing data storage 221 stores, in place of the correction value of the incentive unit price, parameters indicating the number of times of referencing the demand response in the past, and an incentive unit price setting method.

In the present embodiment, the method of calculating the incentive unit price at step S402 of FIG. 15 differs from the second embodiment. The processing at other steps in FIG. 15 is the same is the case of the second embodiment.

The incentive unit price setter 334 sets the electricity unit price based Equation (12).

[Equation 12]

$$E_C^t = E_{CHG}^t + \frac{\sum_{n=1}^{i} INCn}{i}$$

Equation (12)

In the above, $INC_n$ (Yen/kilowatt-hour) indicates a past-agreed amount of the incentive unit price n times ago. The i (times) is the number of times of referencing the demand response in the past.

In Equation (12), the current time incentive unit expectation is based on the mean value of the past-agreed amounts. The incentive unit price setter 334, based on Equation (12), makes the electricity unit price reflect the expected value of the incentive unit price, based on the mean value of the past-agreed amounts.

Alternatively, the incentive unit price setter 334 may set the electricity unit price based on Equation (13).

[Equation 13]

$$E_C^t = E_{CHG}^t + \max(INCn)(n=1,2,\ldots,i)$$

Equation (13)

In the above, max(INCn) indicates the maximum value of INCn.

In Equation (13), the current incentive unit price is expected based on the maximum value of the past-agreed amounts that were targets of referencing. The incentive unit price setter 334, based on Equation (13), makes the electricity unit price reflect the expected value of the incentive unit price based on the maximum value of the past-agreed amounts which were the targets of referencing.

Alternatively, the incentive unit price setter 334 may set the electricity unit price based on Equation (14).

[Equation 14]

$$E_C^t = E_{CHG}^t + \min(INCn)(n=1,2,\ldots,i)$$

Equation (14)

In the above min(INCn) is the minimum value of INCn.

In Equation (14), the current incentive unit price is expected based on the minimum value of the past-agreed amounts that were targets of referencing. The incentive unit price setter 334, based on Equation (14), makes the electricity unit price reflect the expected value of the incentive unit price based on the minimum value of the past-agreed amounts which were the targets of referencing.

The incentive unit price setter 334 uses, among Equation (12) to Equation (14), equations indicated by the parameters of the incentive unit price setting method stored in the processing data storage 321 so as to set the electricity unit price. The parameters are set by the user of the received electric power reduction information calculation apparatus 300.

As noted above, the incentive unit price setter 334 sets the incentive unit price based on the past-agreed amounts of past incentive unit prices. By doing this, the incentive unit price setter 334 need not repeatedly set the incentive unit price, and the reduction information calculator 135 need not repeatedly perform the optimization computation. These points enable a reduction in the load on the processor 330.

The incentive unit price setter 334 sets the incentive unit price based on the past-agreed amounts of past incentive unit prices. The reduction information calculator 135 calculates the received electric power reduction amount based on an incentive unit price set by the incentive unit price setter 334. Additionally, the output equipment 240 displays the incentive unit price set by the incentive unit price setter 334 and the received electric power reduction amount calculated by the reduction information calculator 135.

Doing this enables the output equipment 240 to offer bidding conditions that offer greater promise of winning in the bidding at a point based on past performance.

The incentive unit price setter 334 switches the method of setting the incentive unit price in accordance with a parameter set by the user. The reduction information calculator 135 calculates the received electric power reduction amount based on the incentive unit price set by the incentive unit price setter 334. Additionally, the output equipment 240 displays the incentive unit price set by the incentive unit price setter 334 and the received electric power reduction amount calculated by the reduction information calculator 135.

By doing this, the output equipment 240 can offer bidding conditions that match the bidding strategy of a user (for example, an electric power consumer). The output equipment 240, by indicating a received electric power reduction amount obtained by optimization computation by the reduction information calculator 135, can offer bidding conditions that offer promise of a profit to an electric power consumer, in accordance with bidding-type demand response.

In the case of the incentive unit price setter 334 setting an incentive unit price based on the maximum value of the past-agreed amounts that were the target of referencing, the incentive unit price offered by the output equipment 240 is relatively high. With regard to this point, the output equipment 240 can offer bidding conditions having the promise of an increased amount of incentive.

In contrast, when the incentive unit price setter 334 sets the incentive unit price based on the minimum value of the past-agreed amounts that were the target of referencing, the incentive unit price offered by the output equipment 240 is relatively low. With regard to this point, the output equipment 240 can offer bidding conditions that offer a high possibility of winning in the bidding.

In contrast, when the incentive unit price setter 334 sets the incentive unit price based on the mean value of the past-agreed amounts that were the target of referencing, the incentive unit price offered by the output equipment 240 is lower than the case based on the maximum value and higher than the case based on the minimum value. With regard to this point, the output equipment 240 can offer bidding conditions that offer a higher possibility of winning in the bidding than the case based on the maximum amount and that also offer promise of a higher incentive amount than the case based on the minimum value.

A received electric power reduction information calculation apparatus according to at least one of the above-described embodiments has a reduction information calculator that, based on the energy fee (electricity fee and gas fee) that reflects an expected amount of an incentive with respect to a reduction of the received electric power, determines the reduction amount of received electric power in accordance with forecast values of energy supplied amounts and energy consumed amounts of the control target equipments.

Doing this enables the received electric power reduction information calculation apparatus to offer bidding conditions suitable to the expected fee of incentive and, in doing so, to support so that the energy consumer does not suffer a loss in an exchange between an energy supplier and an energy consumer for the purpose of determining the demand response inventive amount.

A program to implement all or a part of the functions of the processor 130, 230, or 330 may be recorded in a computer-readable recording medium and the program recorded into the recording medium, read into a computer system, and executed thereby so as to perform processing of various parts. The "computer system" used herein may one that includes an operating system and hardware such as peripheral equipments.

In the case of using the WWW system, "computer system" also includes a webpage-providing environment (or displaying environment).

The "computer-readable recording medium" includes a removable medium such as a flexible disc, an opto-magnetic disk, and a Compact Disc, or a non-temporary storage medium represented by a storage equipment such as a hard disk built into a computer system. Additionally, "computer-readable recording medium" includes a non-temporary storage medium that dynamically holds a program for a short time, such as a communication line in the case of transmitting a program via a network such as the Internet or a communication line such as a telephone line, and non-temporarily storage medium that holds a program for a certain time, such as a volatile memory within a computer system that functions as a server or client. The above-noted program may be one for implementing a part of the above-described functionality, and it may implement the above-described functionality in combination with a program already recorded in a computer system.

In the foregoing, although a number of embodiments of the present invention have been described, the embodiments have been presented as examples, and these are not intended to restrict the scope of the present invention. These embodiments may take various other forms and, without exceeding the scope of the present invention, may be subjected to various omissions, replacements, and changes. These embodiments and variations thereof, just as they are encompassed in the scope and spirit of the present invention, are encompassed in the invention recited in the claims and equivalents thereto.

The invention claimed is:

1. A received energy reduction information calculation apparatus comprising:
    a transceiver and receiving unit configured to communicate with a controller; and
    circuitry configured to:
    predict a prediction amount of at least one of energy supply and energy consumption in a future prescribed time period with respect to at least one control target equipment, which each acts as either one of an energy-supplying equipment and an energy-consuming equipment,
    set a plurality of incentive unit prices in association with a demand response;
    calculate, for each of the plurality of incentive unit prices, based on the prediction amount and an energy fee reflected from each of the plurality of incentive unit prices, at least one operation schedule of the at least one control target equipment for the demand response,
    calculate a reduction amount of a received energy in accordance with the at least one operation schedule, and
    modify an operating schedule of the at least one control target equipment for a set period of time, based on the calculated reduction amount.

2. The received energy reduction information calculation apparatus according to claim 1, wherein the circuitry is further configured to:
    acquire an incentive unit price change amount and an incentive unit price upper limit value, and
    set a plurality of incentive unit prices based on the incentive unit price change amount and the incentive unit price upper limit value as acquired.

3. The received energy reduction information calculation apparatus according to claim 1, further comprising:
    a display device that displays the reduction amount of the received energy calculated, using a graph showing a relationship between the incentive unit price and the reduction amount of the received energy.

4. The received energy reduction information calculation apparatus according to claim 3, wherein the display device displays, on the graph, a past-agreed amount of the incentive unit price.

5. The received energy reduction information calculation apparatus according to claim 1, wherein the circuitry is further configured to:
    acquire a past-agreed amount of the incentive unit price,
    set an expected amount of the incentive unit price based on the past-agreed amount, and
    calculate the received energy reduction amount with respect to an expected value of the incentive unit price set.

6. The received energy reduction information calculation apparatus according to claim 5, wherein the circuitry is further configured to set the expected amount, based on a mean value of the past-agreed amounts of the incentive unit price which were agreed in demand responses plural times in the past.

7. The received energy reduction information calculation apparatus according to claim 5, wherein the circuitry is further configured to set the expected amount, based on a minimum value of the past-agreed amounts of the incentive unit price which were agreed in demand responses plural times in the past.

8. The received energy reduction information calculation apparatus according to claim 5, wherein the circuitry is further configured to set the expected amount, based on a maximum value of the past-agreed amounts of the incentive unit price which were agreed in demand responses plural times in the past.

9. A received energy reduction information calculation apparatus comprising:
    a transceiver configured to communicate with a controller; and
    circuitry configured to
    predict a prediction amount of at least one of energy supply and energy consumption in a future prescribed time period with respect to at least one control target equipment, which each acts as either one of an energy-supplying equipment and an energy-consuming equipment,
    calculate, based on the prediction amount and each energy fee reflected from a respective assumed incentive price associated with a demand response, at least one operation schedule of the at least one control target equipment for the demand response, and calculate a reduction amount of a received energy in accordance with the at least one operation schedule, acquire an incentive unit price change amount and an incentive unit price upper limit value, set a plurality of incentive unit prices based on the incentive unit price change amount and the incentive unit price upper limit value as acquired, calculate the received energy reduction amount for each incentive unit price of incentive set, and modify an operating schedule of the at least one control target equipment for a set period of time, based on the calculated reduction amount.

10. A received energy reduction information calculation apparatus comprising:

a transceiver configured to communicate with a controller; and circuitry configured to predict a prediction amount of at least one of energy supply and energy consumption in a future prescribed time period with respect to at least one control target equipment, which each acts as either one of an energy-supplying equipment and an energy-consuming equipment, calculate, based on the prediction amount and each energy fee reflected from a respective assumed incentive price associated with a demand response, at least one operation schedule of the at least one control target equipment for the demand response, and calculate a reduction amount of a received energy in accordance with the at least one operation schedule, acquire a past-agreed amount of the incentive unit price, set an expected amount of the incentive unit price based on a mean value of the past-agreed amounts of the incentive unit price which were agreed in demand responses plural times in the past, calculate the received energy reduction amount with respect to an expected value of the incentive unit price set, and modify an operating schedule of the at least one control target equipment for a set period of time, based on the calculated reduction amount.

11. A received energy reduction information calculation apparatus comprising:

a transceiver configured to communicate with a controller; and circuitry configured to predict a prediction amount of at least one of energy supply and energy consumption in a future prescribed time period with respect to at least one control target equipment, which each acts as either one of an energy-supplying equipment and an energy-consuming equipment, calculate, based on the prediction amount and each energy fee reflected from a respective assumed incentive price associated with a demand response, at least one operation schedule of the at least one control target equipment for the demand response, and calculate a reduction amount of a received energy in accordance with the at least one operation schedule, acquire a past-agreed amount of the incentive unit price, set an expected amount of the incentive unit price based on a minimum value of the past-agreed amounts of the incentive unit price which were agreed in demand responses plural times in the past, calculate the received energy reduction amount with respect to an expected value of the incentive unit price set, and modify an operating schedule of the at least one control target equipment for a set period of time, based on the calculated reduction amount.

12. A received energy reduction information calculation apparatus comprising:

a transceiver configured to communicate with a controller; and circuitry configured to predict a prediction amount of at least one of energy supply and energy consumption in a future prescribed time period with respect to at least one control target equipment, which each acts as either one of an energy-supplying equipment and an energy-consuming equipment, calculate, based on the prediction amount and each energy fee reflected from a respective assumed incentive price associated with a demand response, at least one operation schedule of the at least one control target equipment for the demand response, and calculate a reduction amount of a received energy in accordance with the at least one operation schedule, acquire a past-agreed amount of the incentive unit price, set an expected amount of the incentive unit price based on a maximum value of the past-agreed amounts of the incentive unit price which were agreed in demand responses plural times in the past, calculate the received energy reduction amount with respect to an expected value of the incentive unit price set, and modify an operating schedule of the at least one control target equipment for a set period of time, based on the calculated reduction amount.

* * * * *